United States Patent [19]

Smyers

[11] Patent Number: 4,546,997
[45] Date of Patent: Oct. 15, 1985

[54] VEHICLE STEERING AND SUSPENSION SYSTEM

[75] Inventor: Eugene D. Smyers, Hendersonville, N.C.

[73] Assignee: John Shuttleworth, Hendersonville, N.C.

[21] Appl. No.: 518,203

[22] Filed: Jul. 28, 1983

[51] Int. Cl.⁴ .............................................. B62D 9/02
[52] U.S. Cl. ...................................... 280/772; 180/41; 180/210; 280/6.11; 280/95 R; 280/112 A; 280/267
[58] Field of Search ...................... 280/6.14, 6.11, 267, 280/269, 772, 112 A, 93, 95 R, 664; 180/41, 210

[56] References Cited

U.S. PATENT DOCUMENTS

| | | | |
|---|---|---|---|
| 1,283,942 | 11/1918 | Spanovic | 280/269 |
| 2,029,753 | 2/1936 | Minot | 280/772 |
| 2,045,562 | 6/1936 | Adaskin | 280/772 |
| 2,053,294 | 9/1936 | MacEachen | 180/210 |
| 2,260,102 | 10/1941 | Freret | 280/772 |
| 2,493,817 | 1/1950 | Hare | 180/210 |
| 2,757,938 | 8/1956 | Crowder | 280/112 A |
| 2,998,263 | 8/1961 | Muller et al. | 280/112 A |
| 3,447,623 | 6/1969 | Hott | 180/210 |
| 3,652,104 | 3/1972 | Chabek | 280/664 |
| 3,746,118 | 7/1973 | Altorfer | 180/210 |
| 3,964,563 | 6/1976 | Allen | 180/217 |
| 4,020,914 | 5/1977 | Trautwein | 180/210 |
| 4,072,325 | 2/1978 | Bright et al. | 280/772 |
| 4,088,199 | 5/1978 | Trautwein | 280/772 |
| 4,159,128 | 6/1979 | Blaine | 280/772 |
| 4,415,178 | 11/1983 | Hatsushi et al. | 280/664 |

*Primary Examiner*—Joseph F. Peters, Jr.
*Assistant Examiner*—Kenneth R. Rice
*Attorney, Agent, or Firm*—Shefte, Pinckney & Sawyer

[57] ABSTRACT

A three-wheeled vehicle steering and suspension system including two support assemblies for two opposed front wheels pivotably mounted at opposite sides of the vehicle frame and operatively connected by a hydraulic cylinder arrangement actuated by the vehicle steering linkage for inducing opposed pivotal movement of the support assemblies during vehicle turning to cause leaning of the vehicle in the direction of turning. A biasing arrangement provides the operative connection between the hydraulic cylinder and the support assemblies for transmitting lean-actuating reciprocatory movement of the hydraulic cylinder to the support assemblies while yieldably permitting independent pivotal movements thereof. The biasing arrangement may include respective torsion bars fixed at respective ends thereof to the opposite ends of the hydraulic cylinder and at the other respective ends thereof to the support assemblies, the torsion bars being correspondingly rotated by the hydraulic cylinder to actuate the opposed pivotal movement of the support assemblies. A shock absorber is mounted on each torsion bar and extends therefrom to the respective support assembly for dampening independent movements thereof without creating resistance to rotation of the torsion bar by the hydraulic cylinder. Alternatively, the shock absorber may provide the biasing connection between the hydraulic cylinder and the support assemblies. An electro-hydraulic system actuates reciprocation of the hydraulic cylinder in direct relation to the degree of vehicle turning and to the vehicle speed.

35 Claims, 12 Drawing Figures

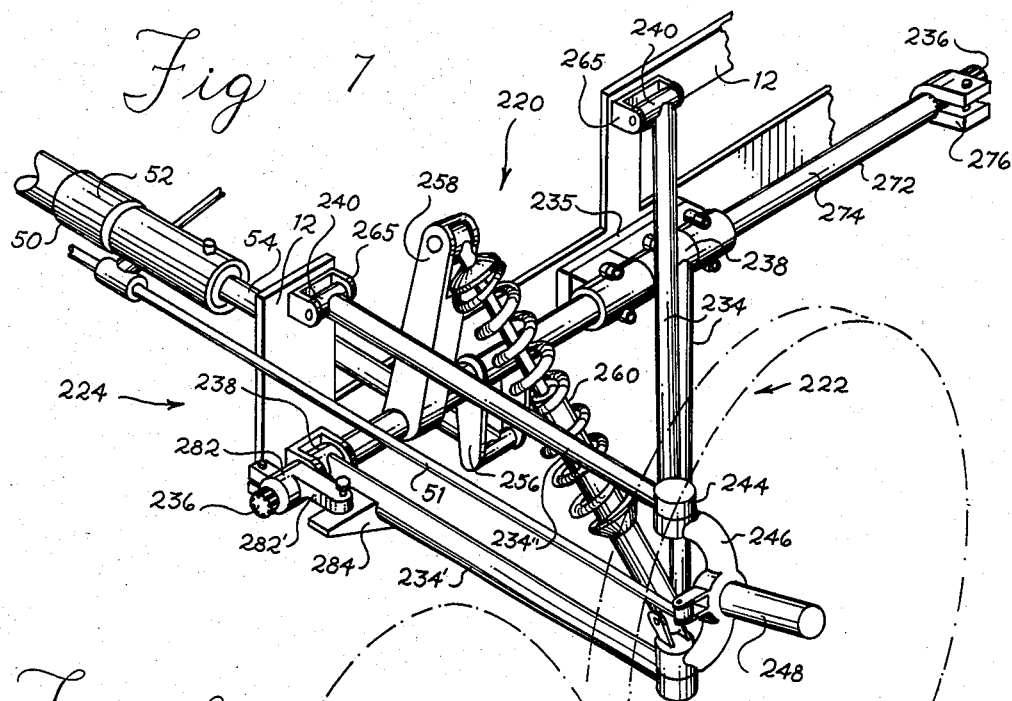
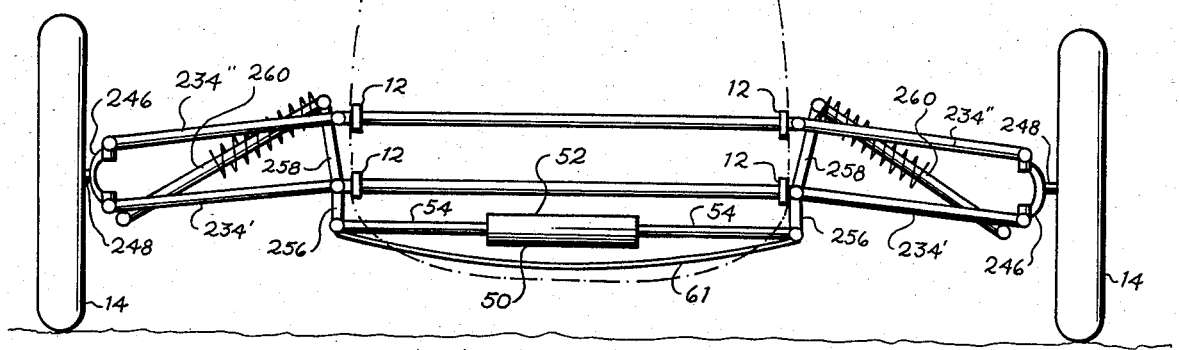
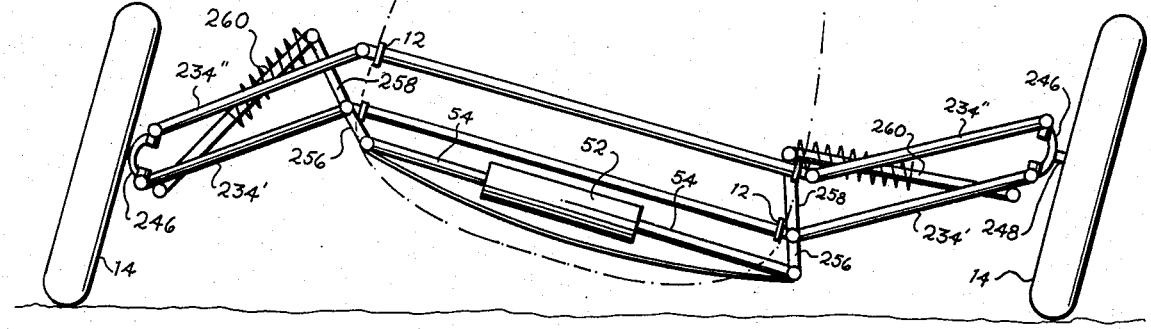

VEHICLE STEERING AND SUSPENSION SYSTEM

BACKGROUND OF THE INVENTION

The present invention relates to vehicle steering and suspension systems and particularly to such systems adapted to induce leaning of the vehicle frame during turning of the vehicle.

Conventional personal automotive vehicles are known to suffer significant deficiencies in steering and general handling capability due to the steering and suspension systems typically employed therein. As is well known, during the turning of a conventional automotive vehicle, centrifugal force acts upon the vehicle radially outwardly of the turn creating a tendency of the vehicle to roll about an axis extending longitudinally of the vehicle. Conventionally, this problem is brought within acceptable limits by the construction of steering and suspension system having a roll axis relatively low to the ground and the rigidifying of the suspension system with "anti-sway" or similar arrangements. However, the tendency of the vehicle to roll during turning still exists in these vehicles, the primary effect of such steering and suspension arrangements being to require greater centrifugal forces to initiate roll.

In the past, various types of vehicle steering and suspension systems have been proposed to improve vehicle handling by counteracting centrifugal forces during turning by mechanically providing for the leaning of the vehicle radially inwardly of turns correspondingly to shift the center of gravity of the vehicle inwardly. See, for example, U.S. Pat. Nos. 1,283,942; 2,029,735; 2,053,294; 2,260,102; 2,493,817; 3,447,623; 3,746,118; 3,964,563; 4,020,914; 4,072,325; and 4,088,199. Mechanically-induced vehicle leaning is perhaps best adapted to three-wheeled vehicles, the above-referenced U.S. Pat. No. 3,964,563 disclosing one particular proposed arrangement for this purpose which employs a mechanism intercoupling two transversely-spaced wheels for automatic opposed reciprocatory pivotal movement upwardly and downwardly for inducing vehicle leaning inwardly of any turning movement of the vehicle.

SUMMARY OF THE INVENTION

The present invention provides an improved steering and suspension system for wheeled vehicles wherein two wheels mounted on opposite transverse sides of the vehicle frame are mechanically associated in a particular manner for steeringinduced opposed pivotal movement to actuate leaning of the frame during vehicle turning. Briefly described, the steering and suspension system includes respective support assemblies for the transverse wheels pivotably mounted independently on opposite sides of the vehicle frame about respective generally horizontal axes, an arrangement operatively connecting the wheel support assemblies and arranged for reciprocatory movement for actuating opposed, substantially equal pivotal movement of the wheel support assemblies, a steering arrangement operatively connected with at least one of the vehicle wheels for actuating turning movement of the vehicle, and an actuating arrangement operatively associating the connecting arrangement with the steering arrangement for actuation of the reciprocatory movement of the connecting arrangement upon vehicle turning to actuate the opposed pivotal movement of the support assemblies porportionately to the degree of vehicle turning to effect upward pivotal movement of the support assembly inwardly of the direction of turning and equivalent downward pivotal movement of the other support assembly.

According to one aspect of the present invention, the connecting arrangement includes respective biasing arrangements by which it is affixed respectively to the support assemblies for urging the support assemblies into respective equilibrium dispositions relative to the connecting arrangement for movement therewith and being yieldable for permitting independent pivotal movement of each support assembly. Each such biasing arrangement particularly includes a shock absorbing assembly for dampening the independent pivotal movements of the associated support assembly.

Preferably, the connecting arrangement includes a hydraulically-actuated piston and cylinder assembly of the double acting type having a cylinder from the opposite ends of which respective operating rods extend for unitary reciprocatory movements of the rods. Respective connecting link arm arrangements are operatively affixed respectively to the operating rods and to the biasing arrangements. Each support assembly includes two wheel support arms pivotably supported and extending outwardly from the frame in vertically spaced relation for pivotal movement about substantially horizontal parallel axes extending longitudinally of the frame and being operatively connected in their spaced relation for cooperatively carrying rotatably one of the transverse wheels.

Each shock absorbing assembly is pivotably mounted at a selected location on the connecting arrangement for movement of its mounting location about the pivotal axis of one respective wheel support arm of its associated support assembly and extends therefrom to and is pivotably affixed to the respective wheel support arm. In this manner, the shock absorbing assemblies are arranged for reciprocatory movement with the connecting arrangement such that they do not create biasing forces resistive to actuation of the reciprocatory movement of the connecting arrangement by the steering arrangement. For this purpose, each shock absorbing assembly may be pivotably mounted about the pivot axis between the respective connecting link arm arrangement and the respective operating rod of the piston and cylinder assembly. Further, each shock absorbing assembly may be selectively mounted on the respective connecting link arm arrangement and one respective wheel support arm to extend downwardly from the connecting link arm arrangement to the wheel support arm at a selected angle such that, upon vehicle turning actuation of the reciprocatory movement of the connecting arrangement, the shock absorbing assembly associated with the support assembly on the outside of the direction of the turn is moved translatably into a more upright position than during nonactuation of the reciprocatory movement of the connecting arrangement. In this manner, the resistance to deformation of the outside shock absorbing assembly is increased during turning to prevent deformation of such outside shock absorbing assembly by centrifugal and roll forces created during turning.

In one embodiment, each biasing arrangement includes a torsion bar arrangement rotatably journaled in the frame in generally horizontal disposition and fixed at spaced locations therealong rigidly with the respective connecting link arm arrangement and with one wheel support arm of the respective wheel support assembly, for rotational movement actuated by the reciprocatory movement of the connecting arrangement and for torsional movement independently of the connecting arrangement. Preferably, the wheel support arms and the connecting link arm arrangements are respectively affixed to their associated torsion bar arrangements at relative peripheral dispositions thereon selected in relation to the weight of the vehicle borne by the transverse wheels such that the vehicle wieght causes upward pivotal movement of the wheel support arms and thereby effects a predetermined degree of preloaded torsional movement of the torsion bar arrangements. In one form of this embodiment, each torsion bar arrangement includes a linear tubular sleeve rotatably mounted on the vehicle frame to extend longitudinally thereof and a linear torsion rod coaxially disposed rotatably within the sleeve and rigidly affixed to the sleeve at one end of the torsion rod, the respective wheel support arm being rigidly affixed to the torsion rod at its other end and the connecting link arm arrangement being rigidly affixed to the sleeve. In another form of this embodiment, each torsion bar arrangement includes only a linear torsion rod rotatably mounted on the vehicle frame to extend longitudinally thereof, the connecting link arm arrangement being affixed to the torsion rod at one end thereof and the respective wheel support arm being affixed to the other end of the torsion rod and extending therefrom outwardly of the vehicle frame. In another embodiment, the biasing arrangements do not include any torsion bar arrangements, the biasing arrangements including only the aforedescribed shock absorbing assemblies.

In one embodiment of the wheel support assemblies, the two wheel support arms of each support assembly are of unequal respective length and are operatively connected in non-parallel spaced relation. Each support assembly includes a bell crank having two transversely extending legs and a connecting bar, one bell crank leg being pivotably affixed to the frame and the other bell crank leg being pivotably affixed to one end of the connecting bar with the other end of the connecting bar being pivotably affixed to one wheel support arm and with the other wheel support arm being pivotably supported by the bell crank intermediate its legs. In this manner, the other wheel support arm of each support assembly is adapted for substantially horizontal translatory movement of its pivot axis upon pivotal movement of the support assembly for reducing camber changes of the associated transverse wheel during independent pivotal movement of the support assembly and for causing the associated transverse wheel to lean to substantially the same degree as the vehicle frame during turning of the vehicle.

Preferably, the two transverse wheels are arranged to be steerable, each wheel supporting assembly carrying its associated transverse wheel for turning movement transversely of its rotational axis and the steering arrangement being operatively connected with the transverse wheels to actuate cooperative turning movement thereof. The connecting arrangement further includes a bar or rod arrangement extending between the respecting link arm arrangements for stablizing the connecting arrangement.

According to another aspect of the present invention, the actuating arrangement is adapted for variably actuating the reciprocatory movement of the connecting arrangement during turning of the vehicle in direct relation to the speed of travel of the vehicle. The actuating arrangement includes a tachometer generator operatively associated with one of the vehicle wheels for generating electrical current upon wheel rotation in direct relation to the rotational speed thereof. A source of pressurized fluid is provided for operating the aforementioned cylinder and piston assembly and a variably positionable valve is operatively associated with the fluid source for providing communication between the fluid source and the cylinder and piston assembly for selectively directing flow of the pressurized fluid to opposite sides of the cylinder and piston assembly for respectively causing reciprocating of its operating rods in opposite directions. A sensing arrangement is provided for monitoring the relative positioning of the steering arrangement between an equilibrium position representing no vehicle turning by the steering arrangement and turned positions on opposite sides of the equilibrium position representing vehicle turning thereby for sensing turning movements and the degree thereof by the steering arrangement respectively in opposite directions transversely of the vehicle frame. Preferably, the steering sensing arrangement includes a transducer movably arranged operably in association with the steering arrangement for permitting a predetermined flow of electrical current through the transducer at the equilibrium position of the steering arrangement and for permitting increased and decreased electrical flow therethrough respectively upon turning operation of the steering arrnagement to opposite sides of the equilibrium position in direct proportion to the degree of such turning operation. Another transducer-type sensing arrangement is provided for similarly monitoring the reciprocatory position of the operating rods of the cylinder and piston assembly between an equilibrium position thereof and reciprocated positions thereof in opposite directions from the equilibrium posotion. A valve positioning arrangement is operatively associated with the steering sensing arrangement and with the sensing arrangement for the operating rods of the cylinder and piston assembly for receiving electrical flow respectively therethrough and comparing the values thereof. The valve positioning arrangement is operatively associated with the valve to prevent fluid flow from the fluid source to the valve when no electrical imbalance exists between the received values of the steering sensing arrangement and the hydraulic cylinder sensing arrangement. On the other hand, the valve positioning arrangement is arranged for opening communication therethrough between the fluid source and the opposite sides of the cylinder and piston arrangement respectively upon positive and negative electrical imbalances between the received values of the steering sensing arrangement and the hydraulic cylinder sensing arrangement and to maintain such communication open until the reciprocated movement of the cylinder and piston arrangement increases or decreases the electrical value from its associated sensing arrangement to the same increased or decreased value of the steering sensing arrangement. The valve positioning arrangement is also operatively associated with the tachometer generator for receiving and monitoring the magnitude of electrical current generated by it and for magnifying electrical imbalances between the steering and hydraulic cylinder sensing arrangements in direct relation to the magnitude of such generated electrical current.

BRIEF DESCRIPTION OF THE DRAWINGS

FIG. 7 is a detailed perspective view similar to FIG. 2 showing a third embodiment of the steering and suspension system of the present invention for one front wheel of the vehicle;

FIG. 8 is a partially schematic front elevational view of the vehicle of FIG. 1 embodying the steering and suspension system of FIG. 7;

FIG. 9 is a partially schematic front elevational view similar to FIG. 8 but showing the steering and suspension system in a leaning disposition;

DESCRIPTION OF THE PREFERRED EMBODIMENT

Figure 1:
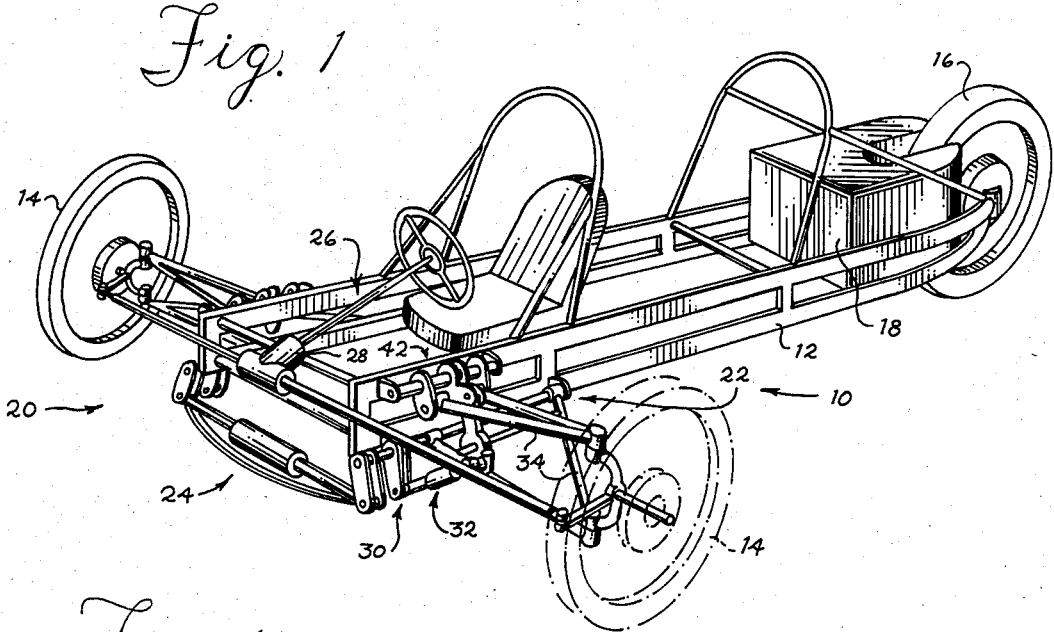
FIG. 1 is a perspective view of a three-wheeled vehicle including a steering and suspension system according to one embodiment of the present invention.

Referring now to the accompanying drawings and initially to FIG. 1, the present invention is illustrated in its preferred embodiment in a three-wheeled vehicle indicated at 10. The vehicle 10 includes a multi tubular longitudinal frame 12 constructed of a welded network of metal tubing, preferably a chrome molybdenum alloy and/or lightweight steel tubing or another lightweight metal tubing such as aluminum. Preferably, a streamlined, aerodynamic body (not shown) is mounted on and encloses the frame 12. Two steerable wheels 14 are mounted on opposite sides of the frame 12 at its front end and a single non-steerable wheel 16 is mounted centrally of the frame 12 at its rear end longitudinally spaced from the steerable front wheels 14. The wheels 14,16 are of relatively small width and relatively large diameter, e.g. conventional motorcycle wheels, to reduce vehicle rolling resistance. A gasoline-powered engine 18, preferably a motorcycle engine of the two cylinder, four cycle type, is also mounted on the frame 12 at its rear end and is operatively associated with the rear wheel 16 for driving operation thereof. The structure and operative relationships of the body and frame 12, the rear wheel 16, and the engine 18 form no part of the present invention, other than in providing the structural environment in which the present invention is preferably embodied, and accordingly, such structures are only generally illustrated and described herein to the extent necessary to facilitate a complete and enabling disclosure of the present invention.

The present invention resides in a novel steering and suspension system for the two steerable front wheels 14, which assembly is indicated generally in FIG. 1 at 20. The steering and suspension assembly 20 basically constitutes a combined electro-hydraulic and mechanical arrangement by which steering operation of the two front wheels 14 actuates leaning of the vehicle frame 12 from a normally upright disposition in the direction radially inwardly of the particular turn to cause a corresponding shifting of the center of gravity of the vehicle better enabling it to counteract and resist centrifugal and roll forces created during such turning and thereby to provide safer, more secure, and comfortable vehicle handling. The steering and suspension assembly 20 is further and more particularly arranged for actuating such leaning to a degree in each turning movement of the vehicle in direct proportionate relation both to the degree of vehicle turning and to the speed of travel of the vehicle. As used herein, the term "degree of vehicle turning" and variations of such term denote the amount of sharpness of vehicle turning as inversely related to the turning radius, a higher degree of vehicle turning being required for smaller radius turns of the vehicle and conversely a lower degree of vehicle turning being required for larger radius turns.

With reference to FIG. 1, the steering and suspension assembly 20 basically includes two support assemblies 22 pivotably mounted at opposite transverse sides of the front end of the frame 12, respectively extending outwardly therefrom and carrying the two front wheels 14 for rotation about their respective axes and for turning transversely thereof, and a connecting arrangement indicated generally at 24 mounted to the frame 12 at its front end to extend transversely between the opposite sides thereof, affixed respectively at the ends of the connecting arrangement 24 to each support assembly 22 and arranged for reciprocatory movement for actuating opposed, substantially equal pivotal movement of the support assemblies 22. A generally conventional steering linkage of the rack and pinion type, indicated at 26, is operatively connected with both wheel support assemblies 22 for actuating cooperative turning movement of the front wheels 14. A computerized electrohydraulic arrangement, indicated only representatively in FIG. 1 at 28, provides operative association between the connecting arrangement 24 and the steering linkage 26 for actuation of the reciprocatory movement of the connecting arrangement 24 upon steering operation of the steering linkage 26 to actuate the opposed pivotal movement of the support assemblies 22 in direct proportion to the degree of vehicle turning and to the speed of travel of the vehicle variably to effect upward pivotal movement of the support assembly 22 inwardly of the particular turn and equivalent downward pivotal movement of the other wheel support assembly 22 outwardly of the particular turn. The connecting arrangement 24 is particularly constructed to include respective biasing assemblies 30 by which the connecting arrangement 24 is affixed respectively to the wheel support assemblies 22 for urging the support assemblies 22 into respective equilibrium dispositions relative to the connecting arrangement 24 for pivotal movement of the support assemblies 22 upon and with the reciprocatory movement of the connecting arrangement 24 and further the biasing assemblies 30 are yieldable for permitting independent pivotal movement of each wheel support assembly 22. Each biasing assembly 30 includes a shock absorbing assembly 32 for dampening the independent pivotal movements of the associated wheel support assembly 22. In the further illustrations of FIGS. 2-12, four particular embodiments of the mechanical components and two particular embodiments of the electro-hydraulic components of the steering and suspension system of the present invention are illustrated, each of which embodiments will be individually described herein.

Figure 2:
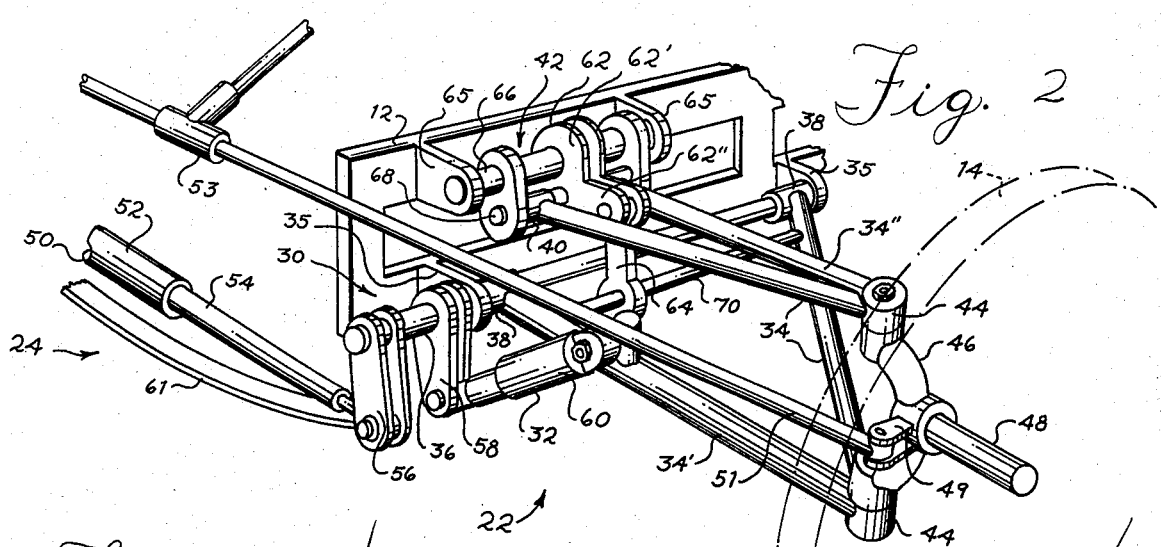
FIG. 2 is a detailed perspective view of the steering and suspension system of FIG. 1 at one front wheel of the vehicle.

Referring now to FIGS. 2-5, one embodiment of the mechanical components of the steering and suspension system 20 are shown. For simplicity of illustration, only one support assembly 22 at one side of the vehicle frame 12 and only a portion of the connecting arrangement 24 are shown, it being understood however as shown in FIG. 1 that identical, mirror-image components are correspondingly mounted and operatively connected at the opposite side of the vehicle frame 12. As seen in FIG. 2, each support assembly 22 includes two support arms 34 constructed of tubular metal in an A-shape, normally referred to as A-arms. A cylindrical rod 36 is rotatably journaled in mounting brackets 35 welded to the vehicle frame 12 to extend longitudinally thereof substantially horizontally, the two legs of the lower A-arm 34' each having cylindrical mounting portions 38 at their ends by which they are mounted about the rod 36 with the rearwardmost mounting portion 38 being rigidly affixed to the rod 36 and the forwardmost mounting portion 38 being unattached to and rotatable about the rod 36, the lower A-arm 34' extending outwardly of the frame 12 from the rod 36. Each leg of the upper A-arm 34" has a similar tubular mounting portion 40 at its end by which the upper A-arm 34" is pivotably mounted on a bell crank arrangement 42, hereinafter more fully described, about a horizontal axis extending longitudinally of the frame 12 at a spacing vertically above and parallel to the rod 36 and from which the upper A-arm 34" extends outwardly of the frame 12 in spaced relation with the lower A-arm 34". The two A-arms 34',34" have similar tubular cylindrical mounting portions 44 at their outwardly extending apexes which are aligned coaxially about a generally vertical line and cooperatively receive an upright wheel support member 46 for rotation about the axis of the mounting portions 44. The upright wheel support member 46 has a spindle 48 rigidly affixed thereto intermediately along its length which spindle 48 extends perpendicularly and outwardly from the support member 46 and serves as the axle on which the associated front wheel 14 is rotatably mounted, the upright wheel support member 46 thereby providing for rotation of the wheel 14 about a generally horizontal axis as well as turning movement of the wheel 14 about a generally vertical axis. An arm 49 extends horizontally and forwardly from the upright wheel support member 46 by which it is conventionally affixed to the steering linkage 26 by a tie rod 51 pivotably connected at its ends respectively to and extending between the arm 49 and the steering rack 53 of the rack and pinion assembly of the steering linkage 16 for actuating cooperative turning movement of the wheels 14.

The connecting arrangement 24 includes a hydraulically actuated cylinder and piston assembly 50 of the conventional double-acting type having a central cylinder member 52 in which is disposed a single piston (not shown) from opposite sides of which extend two piston rods 54, the single piston dividing the cylinder into two chambers by which the arrangement 50 may be hydraulically actuated to reciprocate the piston and two piston rods 54 as a unit linearly in opposite directions. The cylinder 52 is mounted centrally of the vehicle frame 12 to a transverse member of the front portion of the frame 12 to extend transversely between the two support assemblies 22. Two connecting link arms 56 are pivotably affixed to the outwardly extending end of each piston rod 54 about a horizontal axis which extends longitudinally of the vehicle frame 12 in parallel relation to the pivot axes of the adjacent A-arms 34. The connecting link arms 56 are in turn affixed rigidly to the adjacent cylindrical rod 36 on which the lower A-arm 34' is mounted. As will thus be understood, each rod 36 thusly is arranged to form a torsion bar by which its associated support assembly 22 is biased relative to the connecting arrangement 24 in that the connecting arrangement 24 through the connecting link arms 56 is rigidly affixed to each rod 36 at its forward end and the respective lower A-arm 34' is rigidly affixed to the rod 36 at its rearward end. The connecting link arms 56 and the rearward leg of the lower A-arm 34' are respectively affixed to the rod 36 at preselected relative peripheral locations thereon in relation to the weight of the vehicle borne by the suspension system such that the weight of the vehicle when resting on the ground acts through the lower A-arm 34' on the rearward end of the torsion rod 36 to pivot the A-arm 34' upwardly thereby to effect a predetermined degree of preloaded torsional rotation of the torsion rod 36. Secondary connecting link arms 58 substantially identical to the connnecting link arms 56 are rigidly affixed to the torsion rod 36 at a small spacing from the connecting link arms 56 to extend from the torsion rod 36 identically in parallel to the connecting link arms 56. A conventional dashpot-type shock absorber is pivotably mounted between the free extending ends of the secondary connecting link arms 58 about the same pivot axis as between the primary connecting link arms 56 and the associated piston rod 54 of the cylinder and piston arrangement 50, and the shock absorber 60 extends therefrom to and is pivotably mounted on the lower A-arm 34' intermediately of its outward extent about a parallel horizontal pivot axis. A stabilizing member 61, preferably in the form of a unitary connecting bar or rod such as the illustrated leaf spring, is affixed to and extends between the depending ends of the connecting link arms 56 immediately below the cylinder and piston arrangement 50 to provide additional stability in the connection of the support assemblies 22 and to lend an additional factor of safety in such connection against undesired disconnection thereof.

Figure 3:
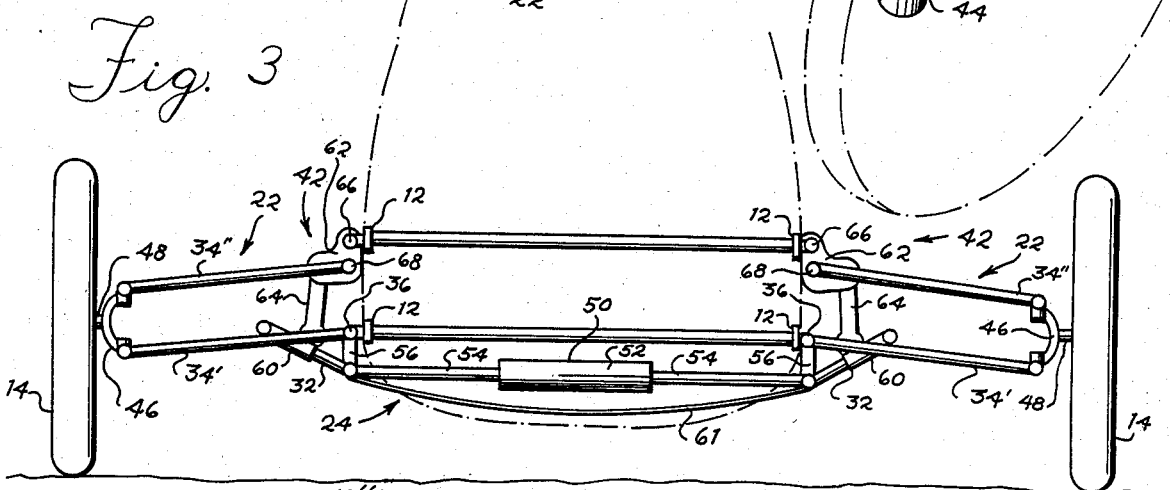
FIG. 3 is partially schematic front elevational view of the vehicle and steering and suspension system of FIG. 1.
Figure 4:
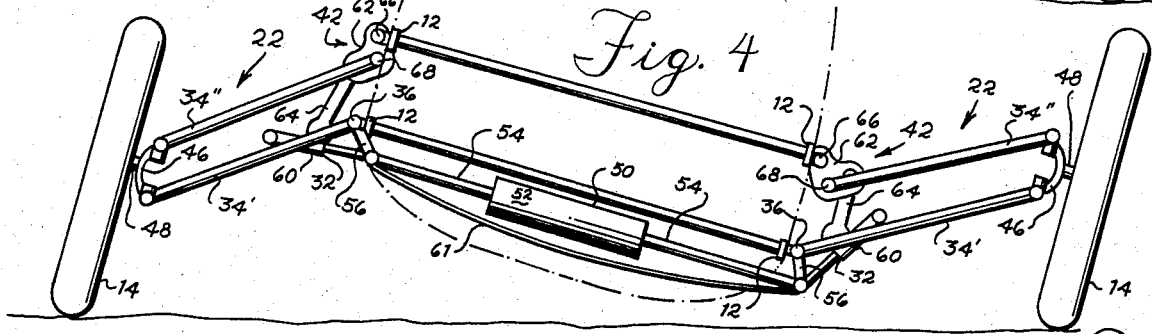
FIG. 4 is partially schematic front elevational view similar to FIG. 3 but illustrating the steering and suspension system in a leaning disposition.
Figure 5:
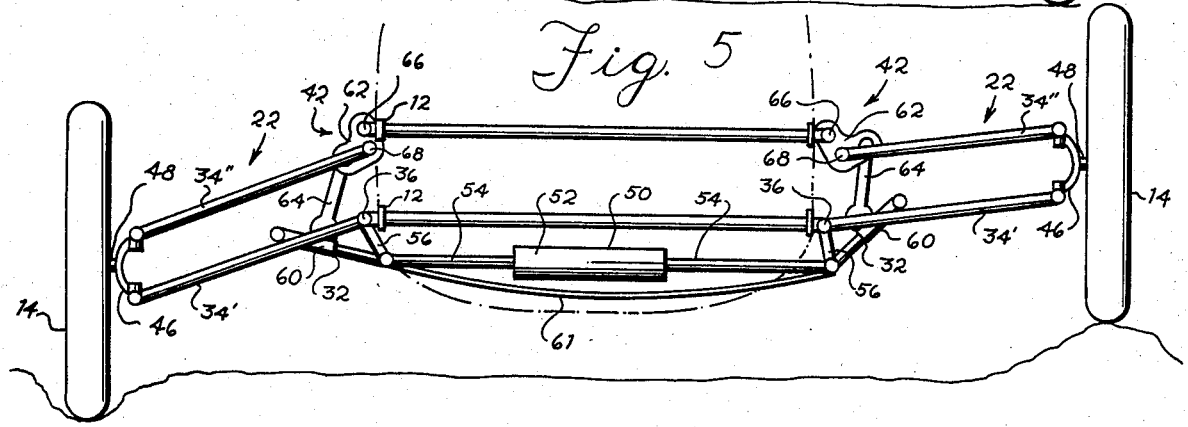
FIG. 5 is a partially schematic front elevational view similar to FIG. 3 but showing the wheels thereof in independently moved dispositions.

Referring now to FIGS. 3-5, the operation of the described mechanical components will be understood to permit independent pivotal movement of the support assemblies 22 to accommodate normal undulations in road surfaces and also to permit leaning of the vehicle frame by actuation of the cylinder and piston arrangement 50. As seen in FIG. 3, the cylinder and piston arrangement 50 is normally disposed in a resting condition with the single piston centrally disposed within the cylinder 52 and each connecting link arm 56,58 in a generally upstanding disposition by which the two torsion bars 36 of the two support assemblies 22 are rigidly held at their forward ends by the connecting arrangement 24. As seen in FIG. 4, upon actuation of the cylinder and piston arrangement 50 to reciprocate the piston and piston rods 54 in a direction toward one side of the vehicle frame, the connecting link arms 56 move pivotably in generally parallel relation about the opposite ends of the piston rods 54 and in turn effect corresponding rotation of the two torsion rods 36. The lower A-arms 34' being rigidly affixed to the torsion bars 36 are caused to rotate at their mounting portions 38 with the torsion bars 36 and are thereby moved pivotably about the torsion bars 36 to a degree coresponding to the degree of rotation thereof. The upper A-arms 34" being joined with the lower A-arms 34' through their associated upright wheel support members 46 and the associated bell crank arrangement 42 are also caused to be pivotably moved to the same degree as the lower A-arms 34'. As will be understood, the A-arms 34 of the support assembly 22 at the side of the vehicle frame 12 toward which the piston rods 54 are reciprocated are caused to be pivoted upwardly while the A-arms 34 of the other support assembly 22 are caused to be pivoted downwardly. As such pivoting of the support assemblies 22 occurs, the vehicle frame 12 will be tilted about a central horizontal axis longitudinally thereof such that the side of the frame 12 toward which the piston rods 54 are reciprocated and at which the associated support assembly 22 is upwardly pivoted is caused to move downwardly while the other side of the vehicle frame 12 away from which the piston rods 54 are reciprocated and at which the associated support assembly 22 is pivoted downwardly is caused to move upwardly. As will hereinafter be more fully described, the aforementioned actuating arrangement 28 is operatively associated with the steering linkage 26 such that, upon turning of the front wheels 14 about their vertical turning axes in either direction transversely of the vehicle frame 12, the cylinder and piston arrangement 50 is hydraulically-operated to cause reciprocation of the piston rods 54 in the same direction of such wheel turning to effect the aforedescribed upward pivotal movement of the support assembly 22 at the side of the vehicle frame 12 radially inwardly of the direction of turning and downward pivotal movement of the other support assembly 22 at the side of the vehicle frame 12 radially outwardly of the direction of turning thereby to effect the aforedescribed tilting or leaning of the vehicle frame 12 in the direction of vehicle turning. In this manner, the center of gravity of the vehicle is shifted during turning toward the direction of turning to induce resistance to centrifugal and roll forces tending to urge the vehicle outwardly of its turning direction.

The torsion rods 36 and shock absorbers 60 further act as a springing or biasing medium to permit independent pivotal movement of the support assemblies 22 for accommodating normal undulations in road surfaces, as is best seen in FIG. 5. Normally, as will be understood, the preloaded torsional rotation of the torsion bars 36 in conjunction with the shock absorbers 60 acts to urge the A-arms 34 of the support assemblies 22 into pivoted dispositions in equilibrium relative to the reciprocal dispositions of the piston rods 54 and connecting link arms 56,58 of the connecting arrangement 24. However, when either front wheel 14 encounters a non-level area in a road surface, the torsion bars 36 and the shock absorbers 60 permit independent pivotal movement of the A-arms 34 of the associated support assembly 22 to maintain the wheel 14 in contact with the road surface with the minimal movement of the vehicle frame 12. More specifically, when one of the wheels 14 encounters a more elevated road area, e.g. a bump or the like, such road area engages the wheel 14 which acts through the upright wheel support member 46 and through the rearward leg of the lower A-arm 34' on the rearward end of the associated torsion bar 36 to cause additional torsional rotation of the torsion bar 36 permitting upward pivotal movement of the two A-arms 34 and of the wheel 14. Upon travel of the vehicle past the elevated area, the torsion bar 36 acts through the rearward leg of the lower A-arm 34' to pivot the A-arms 34 downwardly to relieve the added torsional rotation in the torsion bar 36 and to maintain the wheel 14 in contact with the road surface. Similarly, when a depressed road area, e.g. a pothole or the like, is encountered by either front wheel 14, a lower resistance to the preloaded torsional rotation in the associated torsion bar 36 is transmitted through the wheel 14 and its associated lower A-arm 34' and accordingly, the torsion bar 36 rotates torsionally to unload the preloaded torsional rotation therein causing downward pivotal movement of the associated lower A-arm 34' and the upper A-arm 34" to move the wheel 14 downwardly to maintain it in contact with the depressed road surface, the wheel 14 upon traveling past the depressed road surface and again encountering the higher road area thereabout acting through its lower A-arm 34' to torsionally reload the torsion bar 36. Thus, as will be understood, the torsion bars 36 act in a conventional manner to bias the associated wheels 14 into contact with the road surface in a manner permitting resilient adaptation of the support assemblies 22 to varying road surface areas without transmitting undue corresponding movements to the vehicle frame 12.

The shock absorbers 60 act between the secondary connecting link arms 58 of the connecting arrangement 24 and the lower A-arms 34' to dampen such independent pivotal movements of the support assemblies 22 for more stable maintenance of the wheels 14 in road contact. Notably, because of the aforedescribed arrangement of the support assemblies 22 for operation in effecting leaning of the vehicle frame during turning of the vehicle, the particular location of mounting of the shock absorbers 60 is critical. Conventionally, shock absorbers are mounted to a fixed location on the vehicle frame and extend therefrom to the associated wheel support member or assembly. However, if the shock absorbers 60 were so mounted in the present vehicle, the shock absorbers 60 would act in resistance to the aforedescribed opposed, lean actuating, pivotal movements of the support assemblies 22 during vehicle turning and, in each turning movement of the vehicle, the hydraulic cylinder and piston arrangement 50 would be required to compress one shock absorber 60 and extend the other against their normal biasing forces in order to effect the pivotal movements of the support assemblies 22. This problem is avoided in the present invention by providing the secondary connecting link arms 58 identically to the primary connecting link arms 56 by which the shock absorbers 60 are pivotably mounted respectively about the pivot axes between the opposite ends of the piston rods 54 and the primary connecting link arms 56. In this manner, the mounting locations of the shock absorbers 60, ordinarily termed the "spring perches", are arranged to move during reciprocatory, lean actuating movements of the connecting arrangement 24 to an extent generally corresponding to the extent of arcuate movement transmitted to the other mounted pivot axes of the shock absorbers 60 effected by actuated pivotal movements of the lower A-arms 34' to which the opposite ends of the shock absorbers 60 are mounted whereby the shock absorbers 60 create no resistance to the actuation of the necessary pivotal movements of the support assemblies 22 for actuation of vehicle frame leaning while continuously functioning between the connecting link arms 58 of the connecting arrangement 24 as elements of the vehicle frame 12 and the lower A-arms 34' of the support assemblies 22 to dampen the independent pivotal movements of the support assemblies 22.

In the embodiment of the steering and suspension system 20 shown in FIGS. 2-5, the A-arms 34',34" of each support assembly 22 are of unequal length and are supported in non-parallel relation to provide a relatively low roll axis to the vehicle. However, because the two A-arms 34',34", the vehicle frame 12 and the upright support member 46 of each support assembly 22 do not form a parallelogram, the essentially parallel upright relationship of the frame 12 and the wheels 14 would not be maintained during vehicle leaning and during independent pivotal movement of the support assemblies 22 if both A-arms 34',34" are fixed to the frame 12. Accordingly, the aforementioned bell crank arrangement 42 of each support assembly 22 is employed to effectively enable the two front wheels 14 to lean to a degree corresponding to the leaning of the vehicle frame during turning of the vehicle and also to substantially reduce changes in the camber of the wheels 14 during independent pivotal movements of their support assemblies 22. Each bell crank arrangement 42 basically includes a bell crank member 62 and a connecting link member 64 by which the legs of the associated upper A-arm 34" are pivotably supported on the frame 12 and by which the upper A-arm 34" is operatively connected with the associated lower A-arm 34'. The bell crank member 62 has two perpendicularly extending legs 62',62". The leg 62' is rotatably supported on a shaft 66 which is rotatably journaled in mounting brackets 65 welded to the associated side of the vehicle frame 12 in a horizontal disposition parallel to and vertically spaced from the torsion bar 36. The other leg 62" of the bell crank member 62 is pivotably connected to one end of the connecting member 64, the other end of the connecting member 64 being pivotably mounted on an intermediate rod 70 of the associated lower A-arm 34' which is parallel to the torsion rod 36. The mounting portions 40 of the upper A-arm 34" are rotatably supported on a shaft 68 which extends through the bell crank member 62 at the junction of its legs 62',62" in horizontal disposition parallel to the shaft 66 and the associated torsion rod 36. During both opposed, lean actuating, pivotal movements of the support assemblies 22 and independent pivotal movements thereof, the bell crank member 62 and the connecting member 64 constrain the upper A-arms 34" to move at their pivot axes at their inward mounting portions 40 on the shaft 68 translatably in a horizontal direction which naturally effects and accommodates leaning of the wheels 14 during lean-actuating pivotal movements of the support assemblies 22 and similarly effectively accommodates automatically the maintenance of the camber of the wheels 14 substantially constant during independent pivotal movements of the support assemblies 22. Thus, as seen in FIG. 3, the pivot axes of each associated pair of A-arms 34',34" are vertically aligned when the vehicle is resting on a level surface in a non-leaning disposition. However, when the vehicle is shifted to a leaning disposition as in FIG. 4, the upper A-arm 34" of the support assembly 22 inwardly of the direction of turning is moved translatably outwardly of the frame 12 to effectively extend the length of such A-arm 34" while the upper A-arm 34" of the support assembly 22 outwardly of the direction of turning is moved translatably inwardly of the frame 12 to effectively shorten the length of such A-arm 34", whereby the wheels 14 are naturally and automatically caused to be inclined to the same degree as the vehicle frame 12. Similarly, as seen in FIG. 5, when one wheel 14 encounters an elevated road surface area, the upper A-arm 34" of its associated support assembly 22 is translated inwardly to be effectively shortened and, when one wheel 14 encounters a depressed road surface area, the upper A-arm 34" of its associated support assembly 22 is translated outwardly to be effectively lengthened, thereby to maintain the wheel camber substantially vertical in each instance.

Figure 6:
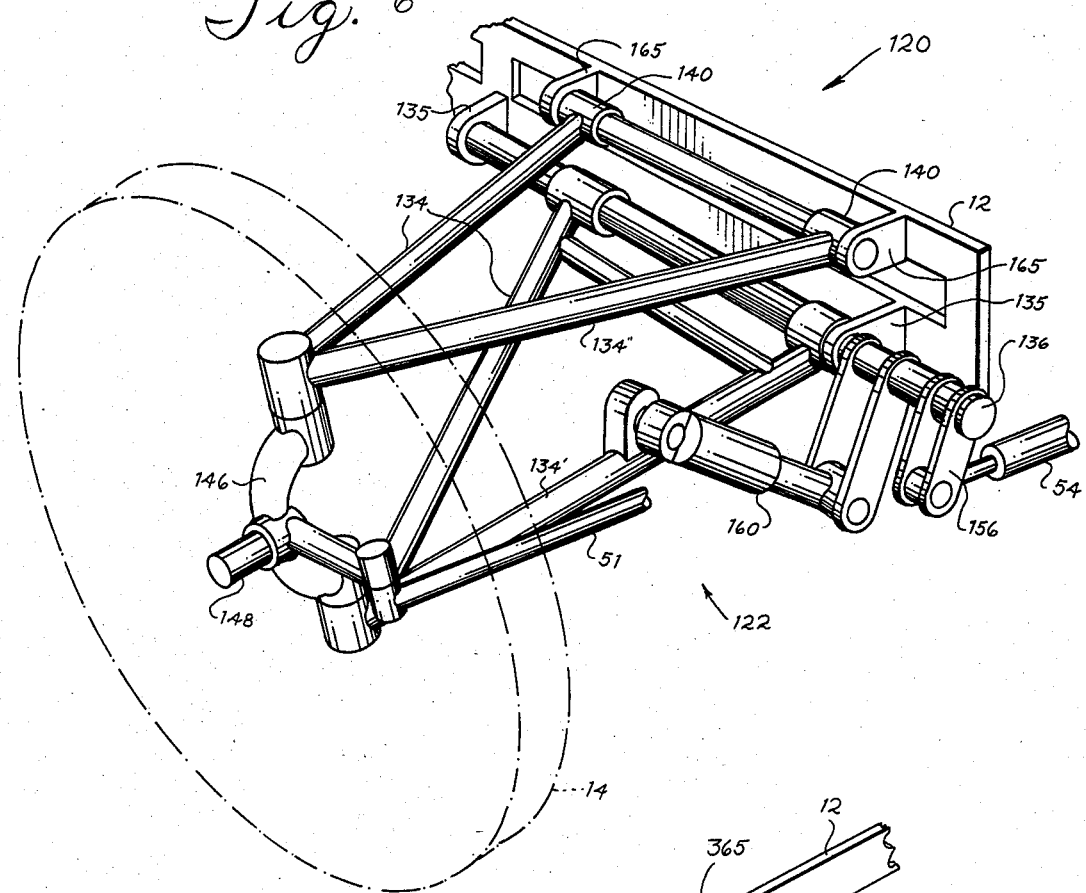
FIG. 6 is a detailed perspective view similar to FIG. 2 of a second embodiment of the steering and suspension system of the present invention at one front wheel of the vehicle.

FIG. 6 illustrates a second embodiment of the mechanical components of the steering and suspension system of the present invention, indicated at 120, which is a modified form of the first above-described steering and suspension system 20 of FIGS. 2-5, the suspension system of FIG. 6 being distinguished from that of FIGS. 2-5 in that no bell crank arrangement 42 is provided. For convenience, components corresponding to those of the steering and suspension system 20 of FIGS. 2-5 are assigned corresponding reference numerals preceded by the numeral "1". Instead, the mounting portions 140 of each upper A-arm 134" are rotatably supported on a fixed pivot axis by mounting brackets 165 welded to the frame 12 for non-translatory, pivotal movement of the upper A-arm 134", with the lower and upper A-arms 134',134" being of substantially equal length and arranged in substantially parallel relation, whereby the upper and lower A-arms 134',134", the vehicle frame 12 and the upright wheel support member 146 essentially form a parallelogram. In this manner, the wheels 14 are caused to lean to an identical degree to the vehicle frame during lean-actuating pivotal movement of the support assemblies 122. However, it will be noted that this parallelogram-type arrangement of the support assemblies 122 results in changes in the camber of the wheels 14 during independent pivotal movements of the support assemblies 122 but, since such pivotal movements are very rarely of a substantial degree, the camber changes are relatively slight and generally inconsequential and therefore this parallelogram-type arrangement is considered advantageous over the first-described embodiment of FIGS. 2-5 in that the elimination of the bell crank arrangement 42 provides mechanical simplicity and a cost savings in the reduction of component parts and necessary assembly labor.

A third embodiment of the mechanical components of the steering and suspension system of the present invention is illustrated in FIGS. 7-9 wherein it is generally indicated at 220. For convenience, the components of this embodiment corresponding to those of FIGS. 2-5 are assigned corresponding reference numerals preceded by the numeral "2". As in the embodiment of FIG. 6, each support assembly 222 includes two equal length A-arms 234 of a substantially identical construction to the A-arms 134 employed in the second-described embodiment of FIG. 6. The upper A-arm 234" is pivotably mounted by its mounting portions 238 to mounting brackets 265 welded to the vehicle frame 12. The connecting arrangement 224 includes two torsion bar assemblies 272 by which it is biasingly connected to each support assembly 222, each torsion bar assembly 272 including a torsion rod 236 coaxially supported rotatably within a generally coextensively extending cylindrical tube 274 with a small extend of the torsion rod 236 extending from each end of the tube 274, the tube 274 having a clamping member 276 welded to one end of the tube 274 by which such tube end and the corresponding end of the torsion rod 236 are rigidly clamped together. The cylindrical tube 274 of the torsion rod assembly 272 is rotatably supported by two mounting brackets 235 welded on the vehicle frame 12 in horizontal disposition extending longitudinally of the frame 12 at a spacing vertically below the mounting brackets 265 of the upper A-arm 234" and the lower A-arm 234' is rotatably supported on the cylindrical tube 274 at the mounting brackets 235. The two A-arms 234', 234" cooperatively carry rotatably at their apexes an upright wheel support member 246 the axle 248 of which carries the respective front wheel 14. As with the steering and suspension system 120 of FIG. 6, the A-arms 234',234" are thusly supported in parallel relation to form a parallelogram-type arrangement with the vehicle frame 12 and the upright wheel support member 246. The portion of the torsion rod 236 extending forwardly from the forwardmost mounting bracket 235 has a clamping member 282 clamped rigidly thereto, the clamping member 282 having a leg portion 282' by which the clamping member 282 is rigidly bolted to a bracket portion 284 of the forwardmost leg of the lower A-arm 234'. The connecting arrangement 224 includes the previously-described hydraulic cylinder and piston arrangement 50 having connecting link arms 256 pivotably affixed to the ends of each of its piston rods 54 from which the connecting link arms 256 extend in upstanding disposition and are affixed to the cylindrical tube 274 intermediately of its mounting brackets 235. As will thus be understood, the torsion rod 236 is arranged for torsional biasing of the support assembly 222 relative to the connecting arrangement 224 in that the connecting arrangement 224 through the connecting link arms 256 and the cylindrical tube 274 is rigidly affixed to the rearward end of the torsion rod 236 and the lower A-arm 234' through the clamping member 282 is rigidly affixed to the forward end of the torsion rod 236. As in the above-described first embodiment of the steering and suspension system 20, the clamp 276 of the cylindrical tube 274 and the clamping member 282 are respectively affixed to the torsion rod 236 at preselected peripheral locations therein in relation to the weight of the vehicle such that the vehicle weight when resting on the ground will act to pivot the lower A-arm 234' upwardly thereby to effect a predetermined degree of preloaded torsional rotation of the torsion rod 236. Advantageously, the bolted connection between the bracket portion 284 of the lower A-arm 234' and the clamping member 282 affixed to the torsion rod 236 permits the selective further preloading or unloading of the torsion rod 236 and correspondingly permits the variation of the above-ground elevation of the vehicle frame 12 by rotational movement of the bolt. Secondary connection link arms 258 are also welded to the cylindrical tube 274 adjacent the primary connecting link arms 256 and extends upwardly therefrom generally in alignment with the connecting link arms 256. A shock absorber member 260 of the combination coil spring and dashpot type is pivotably mounted between the extending endd of the secondary connecting link arms 258 about a horizontal axis parallel to the torsion rod assembly 272 and extends therefrom to and is mounted pivotably on the lower A-arm 234' adjacent the apex of its legs about a parallel horizontal axis.

The operation of the embodiment of FIGS. 7-9 will thus be understood. Actuation of the reciprocatory movement of the piston rods 54 of the cylinder and piston arrangement 50 acts through the connecting link arms 256 to effect rotation of the cylindrical tube 274 and the coaxial torsion rod 236 as a unit which in turn is transmitted to the lower A-arm 234' by the clamping member 282 to effect corresponding pivotal movement of the lower A-arm 234' and of the upper A-arm 234" in the same rotational direction. Thus, opposed pivotal movement of the A-arms 234',234" of the support assemblies 222 is actuated in the same manner as above described with respect to the first embodiment of the steering and suspension system of the present invention to induce leaning of the vehicle frame 12. When undulations of the road surface being traveled are encountered, the cylinder and piston arrangement 50 and the connecting link arms 256 of the connecting arrangement 224 and the cylindrical tube 274 rigidly welded therewith act through the clamping member 276 at the rearward end of the tube 274 to fixedly hold the rearward end of the torsion rod 236 for torsional rotation of the torsion rod 236 by transmission thereto through the clamping member 282 of upward and downward pivotal movements, respectively of the lower A-arm 234'. The shock absorber member 260 acts to dampen such independent pivotal movements of the A-arms 234',234" of the support assembly 222.

As with the first-described embodiment, the secondary connecting link arm 258 to which the shock absorber member 260 is mounted is arranged to move pivotably during reciprocatory movement of the connecting arrangement 224 to cause the pivot axis of the shock absorber member 260 to move arcuately to an extent generally corresponding to the extent of arcuate movement transmitted to the other mounted pivot axis of the shock absorber member 260 effected by pivotal movement of the lower A-arm 234', thereby to prevent the shock absorber 260 from creating any resistance to actuation of the desired pivotal movement of the support assemblies 222 by reciprocatory operation of the connecting arrangement 224. Further, the particular downwardly and outwardly extending angular disposition of the shock absorber member 260 provided by its mounting arrangement in the third embodiment of the suspension system effectively causes the shock absorber member 260 to be moved during downward pivoting of its associated wheel support assembly 222 from its normal angular disposition progressively into a more upright disposition correspondingly increasing progressively the resistance of the shock absorber member 260 to compression by horizontally directed forces. Since the support assembly 222 on the outside of the vehicle frame 12 relative to any given turning movement of the vehicle is pivoted downwardly in the actuation of the previously described leaning of the vehicle frame 12, this particular mounting arrangement of the shock absorber members 260 effectively insures that the shock absorber member 260 associated with the downwardly pivoted, outside support assembly 222 during any given turn becomes more resistive to horizontally directed centrifugal and roll forces in direct relation to the degree of leaning of the vehicle whereby such centrifugal and roll forces will not act to compress such outside shock absorber 260 to counteract or mitigate the induced downward pivoting of its associated support assembly 222 during vehicle turning. As a result of this operative characteristic of the mounting arrangement for the shock absorber members 260 in combination with the torsion bar assembly 272, it is possible to mount the shock absorber 260 between the support assembly 222 and the connecting link arms 258 to normally be uncompressed when the support assembly 222 is in its equilibrium position relative to the connecting arrangement 224 thereby to provide substantially no springing function during non-turning operation of the steering and suspension system 220, employing only the torsion bar assembly 272 for such purpose, and to utilize the shock absorber assemblies 260 solely for anti-roll purposes to resist centrifugal forces during vehicle turning. In this manner, the springing function of the shock absorber members 260 may be selectively adjusted so that the stiffness or softness of the response of the suspension system to normal road undulations may be selectively varied as desired.

Figure 10:
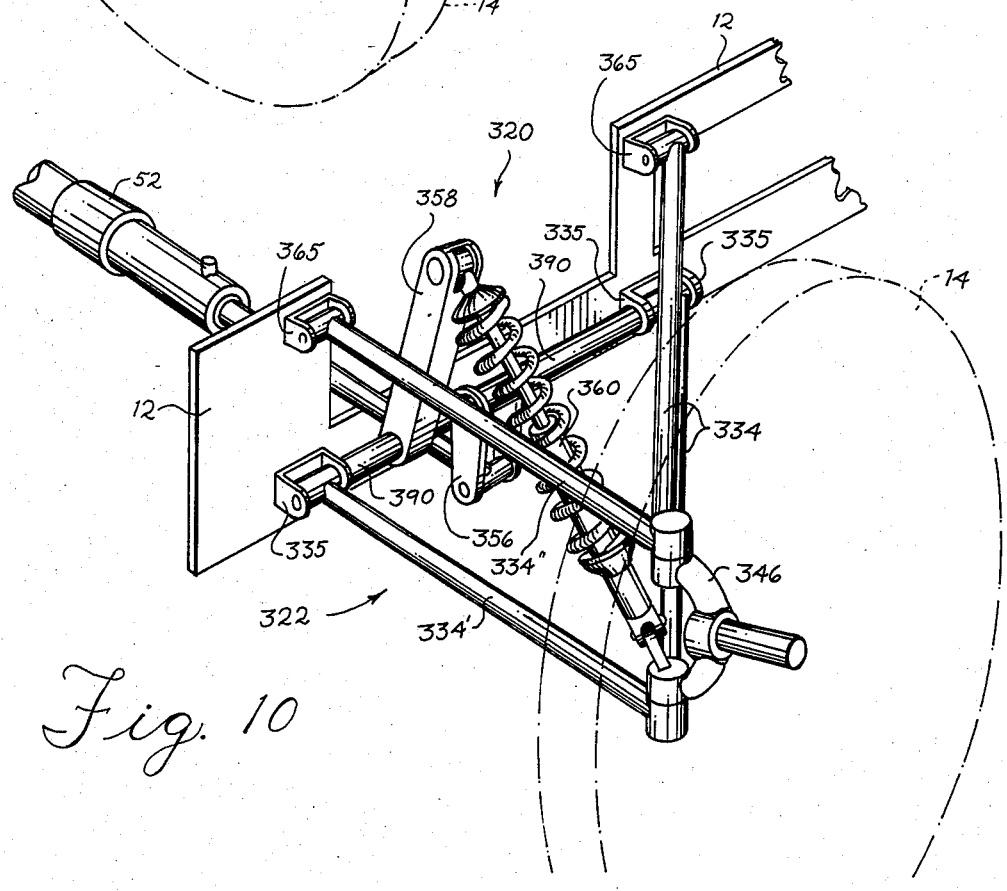
FIG. 10 is a detailed perspective view similar to FIG. 2 of a fourth embodiment of the steering and suspension system of the present invention at one front wheel of the vehicle.

A fourth embodiment of the steering and suspension system of the present invention is illustrated in FIG. 10 wherein it is generally indicated at 320, the steering and suspension system 320 representing a simplified and modified version of the system of FIG. 6 basically eliminating the use of the torsion rod assembly 272 thereof. The steering and suspension system 320 employs two A-arms 334′,334″ of identical construction to the A-arms 234 of the embodiment of FIG. 6. The upper A-arm 334″ is mounted by its extending legs on the vehicle frame 12 by mounting brackets 365 in the same manner as the mounting of upper A-arm 234″ in the embodiment of FIG. 6. The lower A-arm 334′ is similarly mounted by its extending legs on the vehicle frame 12 at a spacing below the upper A-arm 334″ by mounting brackets 335. The two A-arms 334′,334″ cooperatively carry at their apexes an upright wheel support member 346 on which one front wheel 14 is rotatably supported. A cylindrical rod 390 extends horizontally between and is rotatably supported by the mounting brackets 335 coaxially with the pivot axis of the lower A-arm 334′, the rod 390 thusly having no operative connection with the lower A-arm 334′ and therefore being rotatable independently thereof. Two connecting link arms 356 are pivotably affixed to the adjacent end of the piston rod 54 of the cylinder and piston arrangement 350, extend therefrom in upstanding disposition and are rigidly welded to the rod 390, in the identical fashion of the connecting link arms 256 of the embodiment of FIG. 6. Secondary connecting link arms 358 are rigidly welded to the rod 390 to extend therefrom in upstanding disposition generally in alignment with the connecting link arms 356, in the same fashion as connecting link arms 358 of the embodiment of FIG. 6. A shock absorber member 360 of the same type as shock absorber member 260 of FIG. 6 is pivotably mounted between the extending ends of the connecting link arms 358 about a horizontal axis parallel to the rod 390 and to the pivot axis of the A-arms 334′,334″ and the shock absorber member 360 extends therefrom downwardly and outwardly of the vehicle frame 12 and is pivotably affixed about a parallel horizontal axis to the lower A-arm 334′ adjacent the apex of its legs.

Thus, it will be understood that in the embodiment of FIG. 10, the shock absorber member 360 performs the dual functions of the combined torsion bar and shock absorber arrangements of the embodiments of FIGS. 2, 6 and 9. Specifically, upon actuation of the cylinder and piston arrangement 50 to reciprocate the piston rod 54, the connecting link arms 356,358 and the rod 390 are rotated as a unit, the shock absorber member 360 providing the sole means by which such rotational movement is transmitted to the lower and upper A-arms 334′,334″ to actuate the opposed pivotal movements of the support assemblies 322 to induce leaning of the vehicle frame. Further, the shock absorber member 360 provides the sole means by which the support assembly 322 is biased into an equilibrium position relative to the connecting arrangement 324. Thus, when either front wheel 14 encounters undulations in a road surface being traveled, the associated shock absorber member 360 solely acts to permit the pivotal upward pivotal movements of the associated support assembly 322 responsively to elevated road portions and alternatively to bias the associated support assembly 322 for downward pivotal movement to maintain the associated wheel 14 in contact with depressed road areas. Accordingly, in contrast to the embodiment of FIG. 6, the shock absorber member 360 of FIG. 10 is selectively arranged in association with their respective support assemblies 322 for a predetermined degree of preloaded compression of the shock absorbers 360 under the weight of the vehicle when normally resting on a supporting road or other surface. As will be noted, the shock absorber member 360 of FIG. 10 is arranged in the same downwardly and outwardly extending disposition as the shock absorber 260 in FIG. 6 such that the particular shock absorber member 360 associated with the support assembly 322 at the outside of any given turn during vehicle turning will be translatably moved into a more upright disposition than normal to resist anti-leaning compression under the effect of centrifugal and roll forces.

Figure 11:
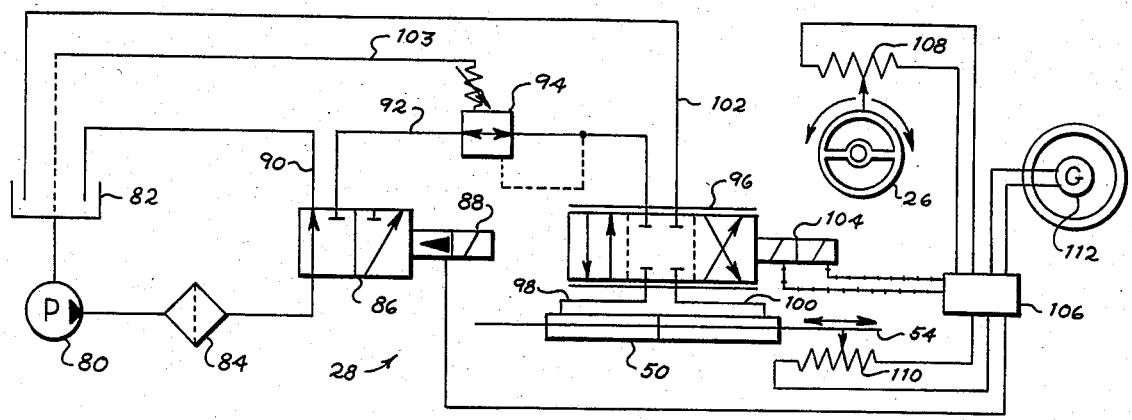
FIG. 11 is a schematic drawing of one electro-hydraulic control arrangement for actuating the vehicle-leaning operation of the steering and suspension system of the present invention.

Referring now to FIG. 11, one embodiment of the actuating arrangement 28 by which the steering linkage 26 is operatively associated with the connecting arrangement 24 to actuate its lean-inducing reciprocatory movement is shown schematically. The actuating arrangement 28 includes a conventional hydraulic pump and fluid flow circuit operatively communicating with the cylinder and piston arrangement 50 to selectively actuate its opposed reciprocatory movements of its piston rods 54. The hydraulic fluid circuit includes a conventional positive displacement hydraulic pump 80 communicating on its intake side with a fluid reservoir 82 and on its outflow side with a fluid filter 84 and a dump valve 86 movably operated by a solenoid 88 to communicate in one position with a return line 90 to the fluid reservoir, as shown in FIG. 11, and in a second leftwardly moved position with an operating fluid flow line 92. The operating line 92 communicates through an adjustable pressure relief valve 94 with a three-position servo valve 96 from which secondary fluid flow operating lines 98,100 extend to opposite ends of the cylinder 52 of the hydraulic cylinder piston arrangement 50 and from which a fluid return line 102 extends to the fluid reservoir 82. The pressure relief valve 94 communicates with a separate fluid return line 103 which extends to the fluid reservoir 82. The servo valve 96 is adapted to prevent communication between the operating line 92 and the operating lines 98,100 in a normal, intermediate position, as shown in FIG. 11, to provide operative motive fluid flow communication from the operating line 92 to the secondary line 98 and simultaneous return fluid flow communication from the other secondary line 100 to the return line 102 in a first moved position of the servo valve 96 rightwardly in the schematic showing in FIG. 11, and to provide operative motive fluid flow communication from the operating line 92 to the secondary line 100 and return fluid flow communication from the other secondary line 98 to the return line 102 in a second moved position of the servo valve 96 leftwardly in the schematic showing in FIG. 11. A conventional torque motor 104 is operatively associated with the servo valve 96 for actuating movements of it between its three described positions.

A conventional analog computer 106 is operatively connected with the servo valve torque motor 104 for controlling its operation to in turn control the position of the servo valve 96. A first transducer, such as the potentiometer 108, is operatively mounted on the rack of the rack and pinion unit (not shown) of the steering linkage 26 for reciprocatory movement therewith during turning operation of the steering linkage 26. The potentiometer 108 is operatively electrically connected in circuit with the analog chipboard of the analog computer 106 for electrical flow between the computer 106 and the potentiometer 108. The potentiometer 108 is arranged in association with the rack and pinion unit and with the computer 106 to permit a predetermined flow of electrical current through the potentiometer 108 in a non-turned equilibrium position of the steering arrangement and for permitting progressively increased and decreased electrical flow therethrough respectively upon turning operation of the steering linkage 26 to opposite sides of the equilibrium position in direct relation to the degree of such turning operation. In this manner, the position of the steering linkage is sensed in effect by the potentiometer 108 and is electrically transmitted to the computer 106. Similarly, a second transducer, such as the potentiometer 110, is operatively mounted on one piston 54 of the piston and cylinder arrangement 50 for reciprocatory movement therewith in both directions relative to an established central, non-reciprocated position of the piston 54 and the potentiometer 110 is electrically connected operatively in circuit with the analog chipboard of the analog computer for electrical flow between the computer 106 and the potentiometer 110. The potentiometer 110 is arranged in association with the piston 54 and with the computer 106 to permit a predetermined flow of electrical current through the potentiometer 110 in the equilibrium position of the piston 54 and for permitting progressively increased and decreased electrical flow therethrough respectively upon reciprocation of the piston 54 in opposite directions of the equilibrium position in direct relation to the degree of such reciprocation. In this manner, the position of the hydraulic cylinder and piston arrangement 50 is sensed in effect by the potentiometer 110 and is electrically transmitted to the computer 106. A conventional tachometer generator 112 is operatively mounted on one of the vehicle wheels 14,16 to be driven thereby to generate electrical current in direct proportion to the rotational speed of the associated vehicle wheel 14,16 and the tachometer generator 112 is electrically connected operatively with the analog chipboard of the analog computer 106 to transmit to it the generated electrical current.

In operation, the dump valve 86 and the servo valve 96 are normally positioned as shown in FIG. 11 when the steering linkage 26 is not being operated to turn the vehicle. The pump 80 is continuously operated to draw fluid from the reservoir 82 and pump such fluid through the filter 84 and the dump valve 86 from which the fluid returns to the reservoir 82. The analog computer 106 includes a comparator circuit (not shown) which is electrically arranged and programmed to constantly commmpare the respective magnitudes of the electrical current received from the two potentiometers 108,110, the two potentiometers being cooperatively arranged such that the magnitudes of the electrical current flow respectively therethrough to the computer 106 are identical when the steering linkage 26 and the cylinder and piston arrangement 50 are both in their respective normal equilibrium positions. When the vehicle turning operation of the steering linkage 26 occurs, the magnitudes of the electrical current from the potentiometer to the analog computer 106 will be increased or decreased according to the direction of steering linkage turning and in direct relation to the degree of such turning. The comparator circuit of the analog computer 106 is arranged to actuate the solenoid 88 to shift the dump valve 86 to its operative leftward position and to actuate the torque motor 104 to shift the servo valve 96 into the appropriate one of its two operative fluid conveying positions immediately when an electrical imbalance occurs between the electrical current values of the steering potentiometer 108 and the hydraulic cylinder potentiometer 110 upon turning actuation of the steering linkage 26, the computer 106 being arranged to shift the servo valve 96 into one position when the electrical current value from the steering potentiometer 108 exceeds that of the hydraulic cylinder potentiometer 110 and alternatively to shift the servo valve into its other operative position when the electrical current value of the steering potentiometer 108 decreases below that of the hydraulic cylinder potentiometer 110. The analog computer 106 is programmed and electrically arranged to maintain the solenoid and servo valves 88,96 in their actuated operative dispositions until the actuated reciprocation of the piston rods 54 of the cylinder and piston arrangement 50 have reached a position at which the electrical current value output of th hydraulic cylinder potentiometer 110 equals that of the steering potentiometer 108. The analog computer 106 is further programmed to magnify the electrical current value received from the steering potentiometer 108 in direct relation to the magnitude of electrical current generated by the tachometer generator 112 to correspondingly increase the degree of reciprocatory movement by the piston and cylinder arrangement 50 required to equalize the electrical values of the potentiometers 108,110 received by the analog computer 106. In this manner, the amount of reciprocatory movement of the piston rods 54 of the hydraulic cylinder and piston arrangement 50 actuated upon any given turning movement of the vehicle is directly related to the degree of the vehicle turn (i.e. the amount of turning movement of the steering linkage), and to the speed of the vehicle.

Figure 12:
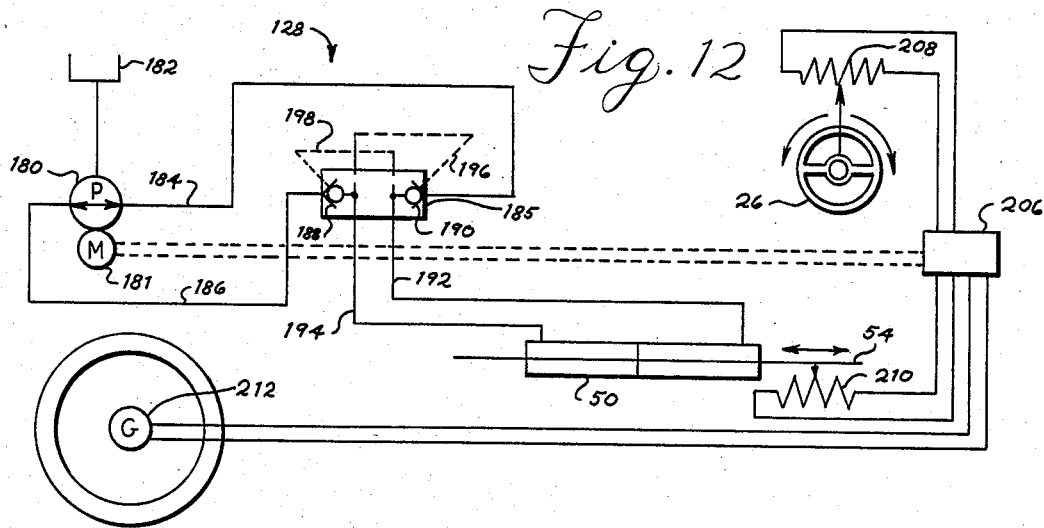
FIG. 12 is a schematic drawing of another embodiment thereof.

An alternative embodiment of the actuating arrangement is shown schematically in FIG. 12 at 128. In this embodiment, the actuating arrangement 128 includes a reversible, positive displacement hydraulic pump 180 driven by an electric motor 181. The pump 180 communicates with a reservoir 182 of hydraulic fluid and in turn communicates through fluid flow lines 184,186 with a pilot operated check valve arrangement 185 having respective check valves 188,190 which in turn communicate through fluid flow lines 192,194 with opposite ends of the cylinder 52 of the cylinder and piston arrangement 50. Each check valve 188,190 is arranged between its respectively associated flow lines 184,186 and 192,194 to permit fluid flow only from the flow line 184 to the flow line 186 and from the flow line 192 to the flow line 194 but not in the reverse direction in either case. Each check valve 188,190 has associated therewith a respective pilot circuit 196,198 which extends from downstream of the check valve 188,190 to the other check valve 188,190 immediately upstream thereof. Otherwise, the actuating arrangement 128 of FIG. 12 is identical to that of FIG. 11, including a steering position sensing transducer, such as the potentiometer 208, a hydraulic cylinder position sensing transducer, such as the potentiometer 210, a tachometer generator 212 associated with one vehicle wheel, and an analog computer 206 having a comparator circuit for monitoring the values of the electrical signals of the potentiometers 208,210 and an actuating circuit for operating the pump motor 181. In operation, when the comparator circuit of the analog computer 206 actuates the motor 181 and pump 180, fluid is pumped from the reservoir 182 through the appropriate flow lines 184,192 or 186,194 to the side of the cylinder 52 of the piston and cylinder arrangement 50 opposite the desired direction of reciprocation of the piston rods 54. Such fluid flow through the initial flow line 184 or 186 displaces the associated check valve 188 or 190 permitting primary fluid flow into the associated secondary flow line 192 or 194, a small quantity of the pressurized fluid passing through the check valve being bled into its associated pilot circuit 196 or 198 to flow therethrough to the upstream side of the other check valve to open it sufficiently for fluid return therethrough and through its associated flow lines to the pump 180 and reservoir 182.

It is contemplated that it may be desirable in some situations or by some persons to selectively increase or decrease the leaning capability of the steering and suspension system of the present invention. For this purpose, there may be provided in either of the above-described embodiments of FIGS. 11 and 12 of the actuating arrangement 28 a third transducer or potentiometer (not shown) in the electrical circuit between the tachometer generator 112 or 212 and the analog chipboard of the analog computer 106 or 206 which third transducer or potentiometer may be manually adjusted by the vehicle operator to selectively control the amount of electrical current transmitted to the analog computer 106. In this manner, manual adjustment of the third potentiometer by the vehicle operator permits the selective maximizing or minimizing of the capability of the steering and suspension system to actuate vehicle leaning in relation to the degree of vehicle turning and the speed of travel of the vehicle. It is also contemplated that it may be desirable to provide a conventional trim circuit (not shown) in the actuating arrangements 28,128 to facilitate minor adjustments in the leaning actuation thereof as may be necessary to compensate to the crown of many ordinary roadways.

The advantages of the present invention will thus be understood. Most importantly, the steering and suspension system provides for the inclination or tilting of the entire vehicle frame as well as the vehicle wheels in the direction of any turning movement of the vehicle actuated through the steering linkage thereof. In this manner, the center of gravity and the longitudinal roll axis of the vehicle are shifted during each turning movement inwardly of the direction of turning thereby to substantially better enable the vehicle to resist the centrifugal and roll forces which act in a direction radially outwardly of each turning movement. As a result, the capability of the vehicle for surely negotiating curves and turns during ordinary vehicle driving is significantly improved with an attendant enhancement of the riding comfort and safety of the vehicle operator and passengers. Furthermore, the steering and suspension system is particularly adapted to induce leaning in each turning movement of the vehicle to a degree relative to vertical in direct relation to the degree of vehicle turning, i.e., the amount of steering linkage movement, as well as the speed of the vehicle. In this manner, the vehicle is caused to lean to a greater degree at high speeds of travel than at low speeds of travel and to a greater degree in sharp, tight turning movements of the vehicle about a relatively small turning radius than in long arcuate turning movements of the vehicle about a relatively large turning radius. Thus, the degree of leaning of the vehicle induced by the steering and suspension system is induced only to the extent actually needed in any given situation. Specifically, virtually no leaning of the vehicle will occur during ordinary parking of the vehicle which occurs at relatively slow speeds. However, conversely, the vehicle is induced to lean to a significant degree when negotiating curves or turns at relatively high speeds and when negotiating relatively sharp tight turns. It will, therefore, be seen that the handling capability of the present vehicle provided by the steering and suspension system of the present invention is very similar to the handling capability of a two wheeled motorcycle but providing a significant improvement over motorcycles in providing the greater stability inherent in the support of three or more wheels and in providing for the automatic inducement of vehicle leaning mechanically in a controlled manner in relation to the parameters of vehicle speed and degree of turning which directly effect the degree of vehicle leaning desirable in any given vehicle turning situation.

The present invention has been described and illustrated herein in regard to its preferred embodiment in a three-wheeled vehicle. However, it will be readily recognized by those skilled in the art that the present invention may be equally well adapted and employed in many other automotive vehicles, particularly conventional four wheel personal passenger vehicles, without departing from the substance and scope of the present invention. Accordingly, the present invention is not limited to the particular embodiments thereof herein illustrated and described, the foregoing disclosure having been made solely for purposes of illustration and to provide an enabling disclosure of the present invention to those persons skilled in the art. Any and all adaptations, modifications, variations and equivalent arrangements of the present invention would be apparent or reasonably suggested by the foregoing disclosure to those persons skilled in the art is considered to be within the scope of the present invention which is to be limited only by the claims appended hereto and equivalents thereof.

I claim:

1. In a wheeled vehicle of the type having a vehicle frame, two wheels mounted on opposite transverse sides of said frame, and at least one wheel mounted on said frame at a longitudinal spacing from said transverse wheels, an improved steering and suspension means for said vehicle adapted to induce leaning of said frame during turning of said vehicle, comprising:
 (a) respective support means for said transverse wheels pivotably mounted independently at said opposite sides of said frame about respective generally horizontal axes, (b) connecting means affixed respectively to each said support means and arranged for reciprocatory movement for actuating opposed, substantially equal pivotal movement of said support means, said connecting means including a respective biasing means affixed to said support means for urging said support means into respective equilibrium dispositions relative to said connecting means for movement therewith and being yieldable for permitting independent pivotal movement of each said support means, respective connecting link arm means operatively affixed rigidly to said biasing means and reciprocating means extending between and connected at its opposite ends respectively with said connecting link arm means, each said biasing means including shock absorbing means for dampening said independent pivotal movements of the associated support means, each said shock absorbing means being pivotally mounted at a selected location on the respective connecting link arm means and extending therefrom to and pivotally affixed to the respective support means for reciprocatory movement with the respective connecting link arm means such that said shock absorbing means do not create biasing forces resistive to actuation of said reciprocatory movement of said connecting means (c) steering means operatively connected with at least one of said vehicle wheels for actuating turning movement thereof transversely of its rotational axis for turning of said vehicle, and (d) actuating means operatively associating said connecting means with said steering means for actuation of said reciprocatory movement of said connecting means upon said turning of said one wheel to actuate said opposed pivotal movement of said support means proportionately to the degree of said turning to effect upward pivotal movement of said support means inwardly of the direction of turning and equivalent downward pivotal movement of the other support means, whereby said transverse wheels are independently supported biasingly for independent movement relative to said frame while, during turning of said vehicle, said frame is caused to lean in the direction of turning proportionately to the degree of turning.

2. The improved steering and suspension means for a wheeled vehicle according to claim 1 and characterized further in that each of said support means comprises wheel support arm means pivotably mounted at one said side of said frame and rotatably carrying one said transverse wheel.

3. The improved steering and suspension means for a wheeled vehicle according to claim 2 and characterized further in that each said support means includes two wheel support arms pivotably supported and extending outwardly from said frame in vertically spaced relation for pivotal movement about substantially horizontal parallel axes extending longitudinally of said frame and being operatively connected in said spaced relation for cooperatively carrying one said transverse wheel.

4. The improved steering and suspension means for a wheeled vehicle according to claim 3 and characterized further in that said two wheel support arms are of unequal respective lengths and are operatively connected in non-parallel spaced relation.

5. The improved steering and suspension means for a wheeled vehicle according to claim 4 and characterized further in that each said support means includes means pivotably affixed to said frame and to one said wheel support arm for pivotably supporting the other said wheel support arm for substantially horizontal translatory movement of its said axis upon pivotal movement thereof for reducing camber changes of the associated one transverse wheel during said independent pivotal movement of said support means and for causing the associated one transverse wheel to lean to substantially the same degree as said frame during turning of said vehicle.

6. The improved steering and suspension means for a wheeled vehicle according to claim 5 and characterized further in that said supporting means for said other wheel support arm includes a bell crank having two transversely extending legs and a connecting bar, one said leg being pivotably affixed to said frame and the other said leg being pivotably affixed to one end of said connecting bar with the other end of said connecting bar being pivotably affixed to said one wheel support arm, said other wheel support arm being pivotably supported by said bell crank intermediate its said legs, whereby said axis of said other wheel support arm is positively translated substantially horizontally upon pivotal movement of said one wheel support arm by pivotal movement of said bell crank and said connecting bar.

7. The improved steering and suspension means for a wheeled vehicle according to claim 3 and characterized further in that said two wheel support arms are of generally equal length and are operatively connected in generally parallel spaced relation.

8. The improved steering and suspension means for a wheeled vehicle according to claim 1 and characterized further in that said connecting means includes means extending between its respective connecting link arm means for stabilizing said connecting means.

9. The improved steering and suspension means for a wheeled vehicle according to claim 1 and characterized further in that said connecting means comprises hydraulically-actuated piston and cylinder means of the double acting type having cylinder means from opposite ends of which respective operating rods extend and being arranged for unitary reciprocatory movements of said rods, said rods being affixed respectively at their extending ends to said connecting link arm means.

10. The improved steering and suspension means for a wheeled vehicle according to claim 1 and characterized further in that said connecting means includes hydraulically reciprocable means arranged for selective reciprocatory movement in opposite directions, a source of pressurized fluid for operating said hydraulically reciprocable means, variably positionable valve means operatively associated with said source and with said hydraulically reciprocable means for providing variable communication therebetween for reciprocation thereof in opposite directions, said valve means being arranged for selectively directing flow to opposite sides of said hydraulically reciprocable means for respectively causing reciprocation thereof in opposite directions, sensing means for monitoring the relative positioning of said steering means between an equilibrium position representing no vehicle turning by said steering means and turned positions on opposite sides of said equilibrium position representing vehicle turning and the degree thereof by said steering means respectively in opposite directions transversely of said vehicle frame, sensing means for monitoring the reciprocatory position of said hydraulically reciprocable means between an equilibrium position thereof representing no vehicle leaning by said hydraulically reciprocable means and reciprocated positions in opposite directions from said equilibrium position representing vehicle leaning and the degree thereof by said hydraulically reciprocable means respectively in opposite directions, and valve positioning means operatively associated with said steering sensing means for translating the sensed position thereof into an electrical value directly related to the relative position of said steering means, operatively associated with said means for sensing said hydraulically reciprocable means for translating the sensed position thereof into an electrical value directly related to the relative position of said hydraulically reciprocable means, said electrical values of said steering means and said hydraulically reciprocable means being equal in their respective equilibrium positions, and operatively associated with said valve means for preventing fluid flow therethrough when said electrical values of said steering means and said hydraulically reciprocable means are equivalent and for permitting fluid flow through said valve means when values of said steering means and said hydraulically reciprocable means are non-equivalent and selectively directing the fluid flow from said valve means to a respective side of said hydraulically reciprocable means to cause reciprocal movement thereof until said electrical values of said steering means and said hydraulically reciprocable means are equivalent.

11. The improved steering and suspension means for a wheeled vehicle according to claim 1 and characterized further in that each said shock absorbing means is pivotably mounted on the respective connecting link arm means about its pivot axis between one respective end of said reciprocating means and the respective connecting link arm means.

12. The improved steering and suspension means for wheeled vehicle according to claim 1 and characterized further in that each said shock absorbing means is selectively mounted on the respective support means and the respective connecting link arm means to extend downwardly from the respective connecting link arm means to the respective support means at a selected angle such that upon turning actuation of said reciprocatory movement of said connecting means the shock absorbing means associated with said other downwardly pivoted support means is moved translatably into a more upright position than during non-actuation of said reciprocatory movement of said connecting means, whereby during turning the resistance to deformation of the shock absorbing means outside of the direction of turning is in creased to prevent deformation of the outside shock absorbing means by centrifugal and roll forces.

13. The improved steering and suspension means for a wheeled vehicle according to claim 1 and characterized further in that said transverse wheels are steerable, each said support means carrying its associated transverse wheel for turning movement transversely of its rotational axis and said steering means being operatively connected with said transverse wheels to actuate cooperative turning movement thereof.

14. The improved steering and suspension means for a wheeled vehicle according to claim 1 and characterized further in that each said biasing means comprises torsion bar means rotatably journaled in said frame in generally horizontal diposition and affixed at spaced locations therealong rigidly with the respective connecting link arm means and with the respective support means for rotational movement actuated by said reciprocatory movement of said connecting means and for torsional movement independently of said connecting means.

15. The improved steering and suspension means for a wheeled vehicle according to claim 1 and characterized further in that each said biasing means consists essentially of said shock absorber means.

16. The improved steering and suspension means for a wheeled vehicle according to claim 15 and characterized further in that each said shock absorbing means is selectively mounted on the respective support means and the respective connecting link arm means to extend downwardly from the respective connecting link arm means to the respective support means at a selected angle such that upon turning actuation of said reciprocatory movement of said connecting means the shock absorbing means associated with said other downwardly pivoted support means is moved translatably into a more upright position than during non-actuation of said reciprocatory movement of said connecting means, whereby during turning the resistance to deformation of the shock absorbing means outside of the direction of turning is increased to prevent deformation of the outside shock absorbing means by centrifugal and roll forces.

17. The improved steering and suspension means for a wheeled vehicle according to claim 1 and characterized further in that each said biasing means comprises torsion bar means rotatably journaled in said frame in generally horizontal disposition and affixed at spaced locations therealong rigidly with said connecting means and with the respective support means for rotational movement actuated by said reciprocatory movement of said connecting means and for torsional movement independently of said connecting means.

18. The improved steering and suspension means for a wheeled vehicle according to claim 17 and characterized further in that said torsion bar means extend longitudinally of said frame and said support means respectively extend therefrom outwardly of said frame.

19. The improved steering and suspension means for a wheeled vehicle according to claim 17 and characterized further in that said support means and said connecting means are respectively affixed to said torsion bar means at relative peripheral dispositions thereon selected in relation to the weight of said vehicle borne by said transverse wheels such that said vehicle weight causes pivotal movement of said support means and thereby effects a predetermined degree of preloaded torsional movement of said torsion bar means.

20. The improved steering and suspension means for a wheeled vehicle according to claim 17 and characterized further in that each said torsion bar means comprises a linear torsion rod rotatably mounted on said vehicle frame to extend longitudinally thereof, said connecting means including a connecting link arm affixed to said torsion rod at one end thereof for actuating rotational movement thereof, and the respective support means including a wheel support arm affixed to the other end of said torsion rod and extending therefrom outwardly of said vehicle frame.

21. The improved steering and suspension means for a wheeled vehicle according to claim 17 and characterized further in that each said torsion bar means comprises a linear tubular sleeve rotatably mounted on said vehicle frame to extend longitudinally thereof and a linear torsion rod coaxially disposed rotatably within said sleeve and rigidly affixed to said sleeve at one end of said torsion rod, the respective support means being rigidly affixed to said torsion rod at the other end thereof and said connecting means including a connecting link arm rigidly affixed to said sleeve.

22. The improved steering and suspension means for a wheeled vehicle according to claim 1 and characterized further in that each said biasing means consists essentially of said shock absorbing means, said connecting means including respective connecting link arm means at its opposite ends, each said support means including a wheel support arm rotatably mounted on and extending outwardly from said frame, and each said shock absorbing means being affixed pivotably to a respective connecting link arm means and to the respective wheel support arm.

23. The improved steering and suspension means for a wheeled vehicle according to claim 22 and characterized further in that each said shock absorbing means is selectively mounted on the respective support means and the respective connecting link arm means to extend downwardly from the respective connecting link arm means to the respective support means at a selected angle such that upon turning actuation of said reciprocatory movement of said connecting means the shock absorbing means associated with said other downwardly pivoted support means is moved translatably into a more upright position than during non-actuation of said reciprocatory movement of said connecting means, whereby during turning the resistance to deformation of the shock absorbing means outside of the direction of turning is increased to prevent deformation of the outside shock absorbing means by centrifugal and roll forces.

24. The improved steering and suspension means for a wheeled vehicle according to claim 22 and characterized further in that each said shock absorbing means is selectively mounted on the respective support means and the respective connecting link arm means to extend downwardly from the respective connecting link arm means to the respective support means at a selected angle such that upon turning actuation of said reciprocatory movement of said connecting means the shock absorbing means associated with said other downwardly pivoted support means is moved translatably into a more upright position than during non-actuation of said reciprocatory movement of said connecting means, whereby during turning the resistance to deformation of the shock absorbing means outside of the direction of turning is increased to prevent deformation of the outside shock absorbing means by centrifugal and roll forces.

25. The improved steering and suspension means for a wheeled vehicle according to claim 1 and characterized further in that said actuating means includes means for variably actuating said reciprocatory movement of said connecting means during turning of said vehicle in direct relation to the speed of travel of said vehicle.

26. The improved steering and suspension means for a wheeled vehicle according to claim 25 and characterized further in that said variably actuating means includes means for monitoring the speed of travel of said vehicle and being associated with said connecting means for controlling its said reciprocatory movement in direct relation to said speed.

27. The improved steering and suspension means for a wheeled vehicle according to claim 26 and characterized further in that said connecting means includes hydraulically reciprocable means arranged for selective reciprocatory movement in opposite directions, said variably actuating means including a source of pressurized fluid for operating said hydraulically reciprocable means and variably positionable valve means operatively associated with said source and with said hydraulically reciprocable means for providing variable communication therebetween for reciprocation thereof in opposite directions, and means associated with said steering means and with said speed monitoring means for operating said valve means for flow of said pressurized fluid therethrough upon operation of said steering means in quantities related to the speed of travel of said vehicle.

28. The improved steering and suspension means for a wheeled vehicle according to claim 27 and characterized further in that said valve means is arranged for selectively directing flow to opposite sides of said hydraulically reciprocable means for respectively causing reciprocation thereof in opposite directions, in that said speed monitoring means includes a tachometer generator operatively associated with one of said vehicle wheels for generating electrical current upon rotation thereof in direct relation to the rotational speed thereof, and in that said variably actuating means includes sensing means for monitoring the relative positioning of said steering means between an equilibrium position representing no vehicle turning by said steering means and turned positions on opposite sides of said equilibrium position representing vehicle turning and the degree thereof by said steering means respectively in opposite directions transversely of said vehicle frame, sensing means for monitoring the reciprocatory position of said hydraulically reciprocable means between an equilibrium position thereof representing no vehicle leaning by said hydraulically reciprocable means and reciprocated positions in opposite directions from said equilibrium position representing vehicle leaning and the degree thereof by said hydraulically reciprocable means respectively in opposite directions, and valve positioning means operatively associated with said steering sensing means for translating the sensed position thereof into an electrical value directly related to the relative position of said steering means, operatively associated with said means for sensing said hydraulically reciprocable means for translating the sensed position thereof into an electrical value directly related to the relative position of said hydraulically reciprocable means, said electrical values of said steering means and said hydraulically reciprocable means being equal in their respective equilibrium positions, operatively associated with said valve means for preventing fluid flow therethrough when said electrical values of said steering means and said hydraulically reciprocable means are equivalent and for permitting fluid flow through said valve means when values of said steering means and said hydraulically reciprocable means are non-equivalent and selectively directing said fluid flow from said valve means to a respective side of said hydraulically reciprocable means to cause reciprocal movement thereof until said electrical values of said steering means and said hydraulically reciprocable means are equivalent, and operatively associated with said tachometer generator for magnifying differences in said electrical values of said steering means and said hydraulically reciprocable means in direct relation to the magnitude of electrical current generated by said tachometer generator.

29. In a wheeled vehicle of the type having a vehicle frame, two wheels mounted on opposite transverse sides of said frame, and at least one wheel mounted on said frame at a longitudinal spacing from said transverse wheels, an improved steering and suspension means for said vehicle adapted to induce leaning of said frame during turning of said vehicle, comprising:
- (a) respective support means for said transverse wheels pivotably mounted independently at said opposite sides of said frame about respective generally horizontal axes, each said support means including a wheel support arm pivotably mounted on and extending outwardly from said frame,
- (b) connecting means affixed respectively to each said support means and arranged for reciprocatory movement for actuating opposed, substantially equal pivotal movement of said support means, said connecting means including respective connecting link arm means at its opposite ends and including respective biasing means affixed to said support means for urging said support means into respective equilibrium dispositions relative to said connecting means for movement therewith and being yieldable for permitting independent pivotal movement of each said support means, each said biasing means consisting essentially of shock absorbing means affixed pivotably to a respective connecting link arm means and to the respective wheel support arm for dampening said independent pivotal movements of the associated support means,
- (c) steering means operatively connected with at least one of said vehicle wheels for actuating turning movement thereof transversely of its rotational axis for turning of said vehicle, and
- (d) actuating means operatively associating said connecting means with said steering means for actuation of said reciprocatory movement of said connecting means upon said turning of said one wheel to actuate said opposed pivotal movement of said support means proportionately to the degree of said turning to effect upward pivotal movement of said support means inwardly of the direction of turning and equivalent downward pivotal movement of the other support means, whereby said transverse wheels are independently supported biasingly for independent movement relative to said frame while, during turning of said vehicle, said frame is caused to lean in the direction of turning proportionately to the degree of turning.

30. In a three-wheeled vehicle of the type having a vehicle frame, two wheels mounted on opposite transverse sides of said frame, and one wheel mounted on said frame at a longitudinal spacing from said transverse wheels, an improved steering and suspension means for said vehicle adapted to induce leaning of said frame during turning of said vehicle, comprising:
- (a) respective support assemblies for said transverse wheels mounted independently on said opposite sides of said frame, each said support assembly having a torsion bar rotatably journaled in said frame in substantially horizontal disposition for rotational and torsional movement of said torsion bar and a wheel support arm rotatably carrying one said transverse wheel and being rigidly affixed to said torsion bar for pivotal movement therewith about its rotational axis,
- (b) connecting means rigidly affixed respectively to each said torsion bar at a spacing therealong from the location of affixation of said wheel support arm and being arranged for reciprocatory movement to actuate opposed, substantially equal rotational movement of said torsion bars to effect opposed, substantially equal pivotal movement of said wheel support arms while permitting independent torsional movement of said torsion bars for independent pivotal movement of said wheel support arms,
- (c) steering means operatively connected with at least one of the three vehicle wheels for actuating turning movement thereof transversely of its rotational axis for turning of said vehicle,
- (d) actuating means operatively connecting said steering means and said connecting means for actuating said reciprocatory movement of said connecting means upon said turning of said one wheel to actuate said opposed rotational movement of said torsion bars proportionately to the degree of said turning to effect upward pivotal movement of the wheel support arm inwardly of the direction of turning and equivalent downward pivotal movement of the other wheel support arm, and
- (e) respective shock absorbing means for each said support assembly, each said shock absorbing means being pivotably mounted on said connecting means for movement of its mounting location about the rotational axis of the respective torsion bar and extending therefrom to and being pivotably affixed to the respective wheel support arm, for urging said connecting means and each said wheel support arm respectively into relative dispositions in equilibrium with one another for aiding control of said opposed pivot movements of said wheel support arms without creating biasing forces resistive to actuation of said opposed pivotal movements and for dampening said independent pivotal and torsional movements of said wheel support arms and said torsion bars, whereby said transverse wheels are independently supported biasingly for independent movement relative to said frame while, during turning of said vehicle, said frame is caused to lean in the direction of turning proportionately to the degree of turning.

31. In a three-wheeled vehicle of the type having a vehicle frame, two wheels mounted on opposite transverse sides of said frame, and one wheel mounted on said frame at a longitudinal spacing from said transverse wheels, an improved steering and suspension means for said vehicle adapted to induce leaning of said frame during turning of said vehicle, comprising:
- (a) respective wheel support arms pivotably mounted independently on said opposite sides of said frame and rotatably carrying said transverse wheels respectively,
- (b) connecting means biasingly affixed respectively to each said wheel support arm and being arranged for reciprocatory movement to actuate opposed, substantially equal pivotal movement of said wheel support arms while permitting independent pivotal movement thereof, said connecting means including respective shock absorbing means for each said support assembly, each said shock absorbing means being pivotably mounted on said connecting means for movement of its mounting location about the pivotal axis of the respective wheel support arm and extending therefrom to and being pivotably affixed to the respective wheel support arm, for urging said connecting means and each said wheel support arm respectively into relative dispositions in equilibrium with one another for aiding control of said opposed pivot movements of said wheel support arms without creating biasing forces resistive to actuation of said opposed pivotal movements and for dampening said independent pivotal movements of said wheel support arms, (c) steering means operatively connected with at least one of the three vehicle wheels for actuating turning movement thereof transversely of its rotational axis for turning of said vehicle, (d) actuating means operatively connecting said steering means and said connecting means for actuating said reciprocatory movement of said connecting means upon said turning of said one wheel to actuate said opposed rotational movement of said wheel support arms proportionately to the degree of said turning to effect upward pivotal movement of the wheel support arm inwardly of the direction of turning and equivalent downward pivotal movement of the other wheel support arm, whereby said transverse wheels are independently supported biasingly for independent movement relative to said frame while, during turning of said vehicle, said frame is caused to lean in the direction of turning proportionately to the degree of turning.

32. The improved steering and suspension means for a wheeled vehicle according to claim 31 and characterized further in that said connecting means includes hydraulically reciprocable means arranged for selective reciprocatory movement in opposite directions, said variably actuating means including a source of pressurized fluid for operating said hydraulically reciprocable means and variably positionable valve means operatively associated with said source and with said hydraulically reciprocable means for providing variable communication therebetween for reciprocation thereof in opposite directions and means associated with said steering means and with said speed monitoring means for operating said valve means for flow of said pressurized fluid therethrough upon operation of said steering means in quantities directly related to the speed of travel of said vehicle.

33. The improved steering and suspension means for a wheeled vehicle according to claim 32 and characterized further in that said valve means is arranged for selectively directing flow to opposite sides of said hydraulically reciprocable means for respectively causing reciprocation thereof in opposite directions, in that said speed monitoring means includes a tachometer generator operatively associated with one of said vehicle wheels for generating electrical current upon rotation thereof in direct relation to the rotational speed thereof, and in that said variably actuating means includes sensing means for monitoring the relative positioning of said steering means between an equilibruim position representing no vehicle turning by said steering means and turned positions on opposite sides of said equilibrium position representation vehicle turning and the degree thereof by said steering means respectively in opposite directions transversely of said vehicle frame, sensing means for monitoring the reciprocatory position of said hydraulically reciprocable means between an equilibrium position thereof representing no vehicle leaning by said hydraulically reciprocable means and reciprocated positions in opposite directions from said equilibrium position representing vehicle leaning and the degree thereof by said hydraulically reciprocable means respectively in opposite directions, and valve positioning means operatively associated with said steering sensing means for translating the sensed position thereof into an electrical value directly related to the relative position of said steering means, operatively associated with said means for sensing said hydraulically reciprocable means for translating the sensed position thereof into an electrical value directly related to the relative position of said hydraulically reciprocable means, said electrical values of said steering means and said hydraulically reciprocable means being equal in their respective equilibrium positions, operatively associated with said valve means for preventing fluid flow therethrough when said electrical values of said steering means and said hydraulically reciprocable means are equivalent and for permitting fluid flow through said valve means when values of said steering means and said hydraulically reciprocable means are non-eqivalent and selectively directing said fluid flow from said valve means to a respective side of said hydraulically reciprocable means to cause reciprocal movement thereof until said electrical values of said steering means and said hydraulically reciprocable means are equivalent, and operatively associated with said tachometer generator for magnifying differences in said electrical values of said steering means and said hydraulically reciprocable means in direct relation to the magnitude of electrical current generated by said tachometer generator.

34. In a wheeled vehicle of the type having a vehicle frame, two wheels mounted on opposite transverse sides of said frame, and at least one wheel mounted on said frame at a longitudinal spacing from said transverse wheels, an improved steering and suspension means for said vehicle adapted to induce leaning of said frame during turning of said vehicle, comprising:

(a) respective support means for said transverse wheels pivotably mounted independently at said opposite sides of said frame about respective generally horizontal axes, (b) connecting means affixed respectively to each said support means and arranged for reciprocatory movement for actuating opposed, substantially equal pivotal movement of said support means, said connecting means including hydraulically reciprocable means arranged for selective reciprocatory movement in opposite directions and further including respective biasing means affixed to said support means for urging said support means into respective equilibrium dispositions relative to said connecting means for movement therewith and being yieldable for permitting independent pivotal movement of each said support means, each said biasing means including shock absorbing means for dampening said independent pivotal movements of the associated support means, (c) steering means operatively connected with at least one of said vehicle wheels for actuating turning movement thereof transversely of its rotational axis for turning of said vehicle, and (d) actuating means operatively associating said connecting means with said steering means for actuation of said reciprocatory movement of said connecting means upon said turning of said one wheel to actuate said opposed pivotal movement of said support means proportionately to the degree of said turning to effect upward pivotal movement of said support means inwardly of the direction of turning and equivalent downward pivotal movement of the other support means, said actuating means including a source of pressurized fluid for operating said hydraulically reciprocable means, variably positionable valve means operatively associated with said source and with said hydraulically reciprocable means for providing variable communication therebetween for reciprocation thereof in opposite directions, said valve means being arranged for selectively directing flow to opposite sides of said hydraulically reciprocable means for respectively causing reciprocation thereof in opposite directions, sensing means for monitoring the relative positioning of said steering means between an equilibrium position representing no vehicle turning by said steering means and turned positions on opposite sides of said equilibrium position representing vehicle turning and the degree thereof by said steering means respectively in opposite directions transversely of said vehicle frame, sensing means for monitoring the reciprocatory position of said hydraulically reciprocable means between an equilibrium position thereof representing no vehicle leaning by said hydraulically reciprocable means and reciprocated positions in opposite directions from said equilibrium position representing vehicle leaning and the degree thereof by said hydraulically reciprocable means respectively in opposite directions, and valve positioning means operatively associated with said steering sensing means for translating the sensed position thereof into an electrical value directly related to the relative position of said steering means, operatively associated with said means for sensing said hydraulically reciprocable means for translating the sensed position thereof into an electrical value directly related to the relative position of said hydraulically reciprocable means, said electrical values of said steering means and said hydraulically reciprocable means being equal in their respective equilibrium positions, and operatively associated with said valve means for preventing fluid flow therethrough when said electrical values of said steering means and said hydraulically reciprocable means are equivalent and for permitting fluid flow through said valve means when values of said steering means and said hydraulically reciprocable means are non-equivalent and selectively directing said fluid flow from said valve means to a respective side of said hydraulically reciprocable means to cause reciprocal movement thereof until said electrical values of said steering means and said hydraulically reciprocable means are equivalent, whereby said transverse wheels are independently supported biasingly for independent movement relative to said frame while, during turning of said vehicle, said frame is caused to lean in the direction of turning proportionately to the degree of turning.

35. The improved steering and suspension means for a wheeled vehicle according to claim 34 and characterized further in that said actuating means includes means for variably actuating said reciprocatory movement of said connecting means during turning of said vehicle in direct relation to the speed of travel of said vehicle, said variably actuating means including means for monitoring the speed of travel of said vehicle, said speed monitoring means including a tachometer generator operatively associated with one of said vehicle wheels for generating electrical current upon rotation thereof in direct relation to the rotational speed thereof, said valve positioning means being further operatively associated with said tachometer generator for magnifying differences in said electrical values of said steering means and said hydraulically reciprocable means in direct relation to the magnitude of electrical current generated by said tachometer generator.

* * * * *

UNITED STATES PATENT OFFICE
CERTIFICATE OF CORRECTION

Patent No. 4,546,997                Dated October 15, 1985

Inventor(s)  Eugene D. Smyers

It is certified that error appears in the above-identified patent and that said Letters Patent are hereby corrected as shown below:

Column 3, Line 10, delete "wieght" and insert therefor -- weight -- .
Column 3, Line 36, delete "length" and insert therefor -- lengths -- .
Column 4, Line 13, delete "reciprocating" and insert therefor -- reciprocation -- .
Column 7, Line 62, delete "16" and insert therefor -- 26 -- .
Column 13, Line 3, delete "extend" and insert therefor -- extent -- .
Column 13, Line 60, delete "connection" and insert therefor -- connecting -- .
Column 18, Line 38, delete "th" and insert therefor -- the -- .
Column 29, Line 61, delete "represention" and insert therefor -- representing -- .
Column 30, Line 20, delete "eqivalent" and insert therefor -- equivalent -- .

Signed and Sealed this

Eighth Day of April 1986

[SEAL]

Attest:

Attesting Officer

DONALD J. QUIGG

Commissioner of Patents and Trademarks